(12) United States Patent
Messina

(10) Patent No.: US 10,011,434 B1
(45) Date of Patent: Jul. 3, 2018

(54) MOBILE CONFIGURABLE CONVEYOR COMPONENT

(71) Applicant: Amazon Technologies, Inc., Seattle, WA (US)

(72) Inventor: Mark Anthony Messina, Carlsbad, CA (US)

(73) Assignee: Amazon Technoloigies, Inc., Seattle, WA (US)

( * ) Notice: Subject to any disclaimer, the term of this patent is extended or adjusted under 35 U.S.C. 154(b) by 0 days.

(21) Appl. No.: 15/463,375

(22) Filed: Mar. 20, 2017

Related U.S. Application Data

(63) Continuation of application No. 14/572,555, filed on Dec. 16, 2014, now Pat. No. 9,637,318.

(51) Int. Cl.
*B65G 21/10* (2006.01)
*B65G 41/00* (2006.01)
*B65G 1/04* (2006.01)
*B65G 15/00* (2006.01)
*B25J 5/00* (2006.01)
*B25J 9/00* (2006.01)
*G05D 1/02* (2006.01)

(52) U.S. Cl.
CPC ............ *B65G 41/008* (2013.01); *B25J 5/007* (2013.01); *B25J 9/0093* (2013.01); *B65G 1/0492* (2013.01); *B65G 15/00* (2013.01); *G05D 1/0287* (2013.01); *G05D 2201/0216* (2013.01); *Y10S 901/01* (2013.01)

(58) Field of Classification Search
CPC ........................... B65G 41/008; B65G 1/0492
USPC .... 198/300, 312, 317, 315, 588, 586, 860.1, 198/850.2, 861.16
See application file for complete search history.

(56) References Cited

U.S. PATENT DOCUMENTS

| | | | | |
|---|---|---|---|---|
| 3,480,292 A | * | 11/1969 | Borkey | B62B 5/0083 254/120 |
| 7,647,664 B2 | * | 1/2010 | Petermann | B65G 41/008 14/2.4 |
| 8,820,509 B2 | * | 9/2014 | Shatters | B65G 41/008 198/300 |
| 9,067,743 B1 | | 6/2015 | Sotelo et al. | |
| 2009/0165524 A1 | | 7/2009 | Hoffman | |

(Continued)

FOREIGN PATENT DOCUMENTS

WO    WO2006044108    4/2006

OTHER PUBLICATIONS

"Lynx Conveyor," Specifications, Adept Technology, Inc., 2014, 2 pages.

(Continued)

*Primary Examiner* — Gene O Crawford
*Assistant Examiner* — Lester Ill Rushin
(74) *Attorney, Agent, or Firm* — Lee & Hayes, PLLC

(57) ABSTRACT

An inventory management system includes a first robotic device and a second robotic device. The first robotic device includes a first conveyor removably docked with a first head of the first robotic device. The second robotic device includes a second conveyor removably docked with a second head of the second robotic device. The first robotic device includes a first conveyor controller that communicates conveyor control signals to a second conveyor controller of the second robotic device. The conveyor control signals specify operations to activate the second motor of the second conveyor.

20 Claims, 12 Drawing Sheets

(56) References Cited

U.S. PATENT DOCUMENTS

2009/0252577 A1  10/2009  Tuffs et al.
2012/0059545 A1   3/2012  Furuno et al.
2013/0248323 A1   9/2013  Sotelo et al.
2016/0167888 A1   6/2016  Messina

OTHER PUBLICATIONS

Office Action for U.S. Appl. No. 14/572,555, dated Mar. 25, 2016, Messina, "Mobile Configurable Conveyor Component", 10 pages.
Office Action for U.S. Appl. No. 14/572,555, dated Aug. 12, 2016, Messina, "Mobile Configurable Conveyor Component", 13 pages.
The PCT Search Report and Written Opinion dated May 17, 2016 for PCT application No. PCT/US2015/064802, 10 pages.
The Australian Office Action dated Jan. 4, 2018 for Australian patent application No. 2015383018, a counterpart foreign application of U.S. Pat. No. 9,637,318, 3 pages.

* cited by examiner

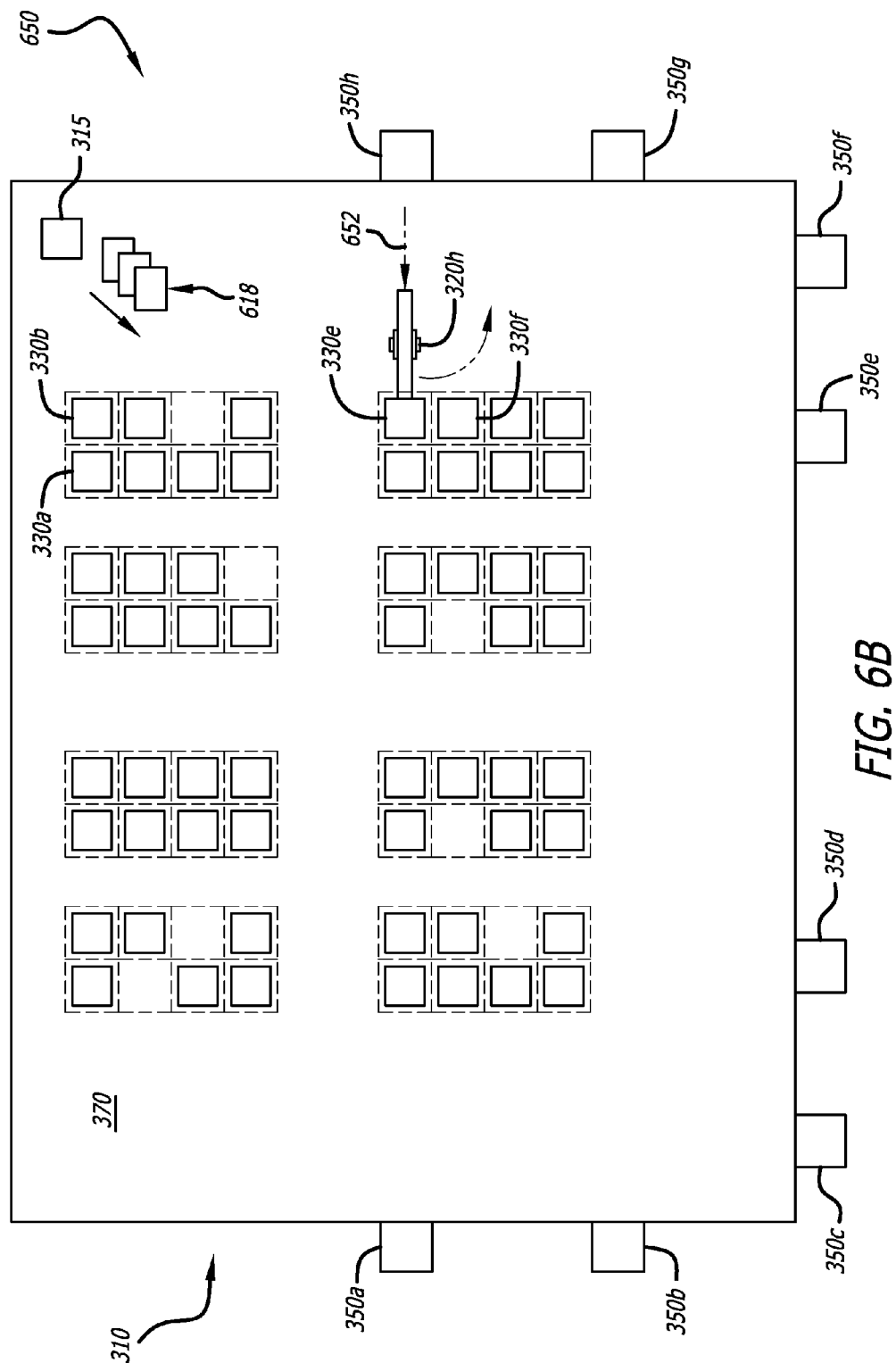

MOBILE CONFIGURABLE CONVEYOR COMPONENT

CROSS-REFERENCE TO RELATED APPLICATION(S)

This application is a continuation of and claims the benefit of the filing date of U.S. application Ser. No. 14/572,555, filed on Dec. 16, 2014 and entitled "Mobile Configurable Conveyor Component," the entirety of which is incorporated herein by reference.

BACKGROUND

Existing inventory systems, such as those in mail-order warehouses, supply chain distribution centers, airport luggage systems, and custom-order manufacturing facilities, etc., can encounter challenges in responding to requests for inventory items. As inventory systems grow, the challenges of completing a number of packing, storing, and other inventory-related tasks becomes increasingly difficult. In inventory systems tasked with responding to large numbers of diverse inventory requests, inefficient utilization of system resources, including space, equipment, and manpower, can result in lower throughput, longer response times, an increasing backlog of unfinished tasks, and overall lower system performance. Additionally, expanding or reducing the size or capabilities of many inventory systems may require non-trivial modifications to existing infrastructure and equipment. Consequently, the cost of incremental changes to capacity or functionality may be prohibitively expensive and, thus, limit the ability of the system to accommodate changes in system throughput.

BRIEF DESCRIPTION OF THE DRAWINGS

Various embodiments in accordance with the present disclosure will be described with reference to the drawings, in which:

FIGS. 6A and 6B illustrate examples of the inventory system in accordance with some embodiments;

DETAILED DESCRIPTION

Figure 1A:
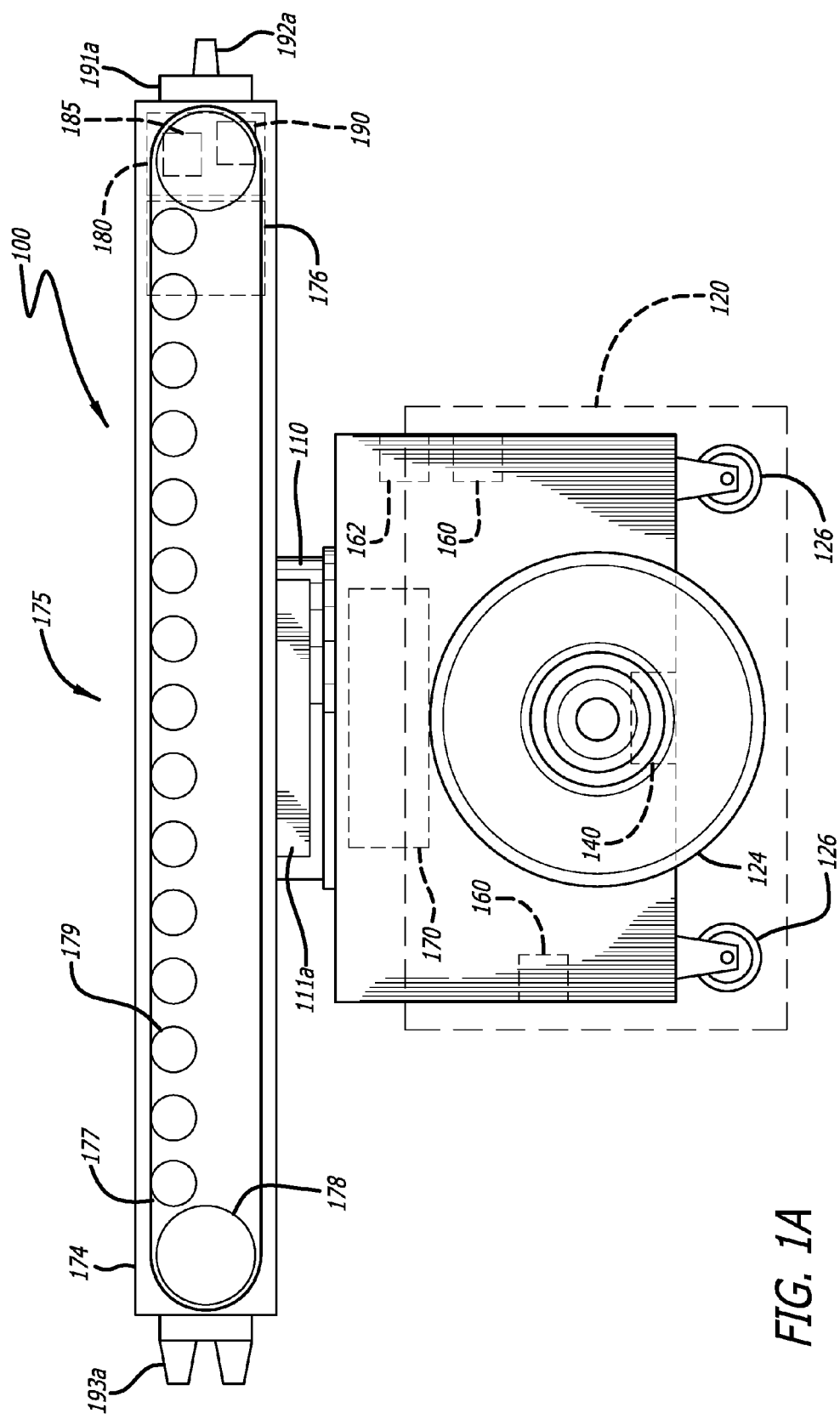
FIGS. 1A and 1B illustrate in detail an example mobile robotic device that may be utilized in an inventory system in accordance with some embodiments.

Systems and apparatuses in accordance with various embodiments of the disclosure may overcome one or more deficiencies experienced in existing approaches with inventory storage and fulfillment of orders. More specifically, embodiments described herein provide implementations for an inventory system that includes one or more mobile robotic devices capable of moving any of one or more inventory holders, items, objects, etc., between locations within a physical space associated with the inventory system.

In an embodiment, an inventory system may provide one or more mobile robotic devices, and one or more inventory holders. Mobile robotic devices may be capable of transporting inventory holders between points within a workspace (e.g., a warehouse, etc.) in response to commands. The mobile robotic devices are independent, self-powered devices configured to move throughout the workspace. Each inventory holder may store one or more types of inventory items. In an embodiment, inventory holders include multiple storage bins with each storage bin capable of holding one or more types of inventory items. Inventory holders are capable of being carried, rolled, and/or otherwise moved by mobile robotic devices in an embodiment.

In a physical space for inventory storage, a conveyor system may be present in order to transport items or objects throughout the space. Such a conveyor system, however, may include several disadvantages such as inflexibility in arrangement or configuration within the physical space, the speed and efficiency with which the conveyor transports goods and materials, and overall cost of such a fixed conveyor system. Moreover, an inflexible conveyor system can present distinct challenges in integrating with mobile robotic devices to provide an efficient inventory system, which can be addressed by embodiments described herein.

As described further herein, mobile robotic devices may be configured with conveyor components to address the aforementioned deficiencies of an existing conveyer system. Such conveyor components may be of various sizes to facilitate different configurations of conveyer segments that traverse various distances of the workspace to reach respective portions of the workspace. Each mobile robotic device is configured to removably attach or dock to a frame of a conveyor component so that the mobile robotic device can transport such a conveyor component throughout the workspace.

Each conveyor component may be of any appropriate length and configured to have connector elements to form a connection with another conveyor component. In this fashion, multiple conveyor components may form a longer conveyor segment to cover a distance throughout the workspace. Such longer conveyor segments may be of any appropriate configuration in order to facilitate moving inventory items or objects over various distances to one or more locations in or outside the workspace. Such locations may include a location where a vehicle may load/unload inventory items or objects, a location where inventory items are stored, a location where inventory items may be further handled by a worker, etc. Multiple mobile robotic devices that form a respective longer conveyor segment can be placed accordingly in the workspace with other mobile robotic devices that form another longer conveyor segment so that multiple conveyor segments are placed adjacent or close to one another.

Additionally, configurations of various conveyor segments can enable one or more mobile robotic devices to perform sortation of inventory items. As described further herein, each mobile robotic device may include a rotating head that enables the mobile robotic device to rotate an attached conveyor component along an axis relative to the mobile robotic device. As inventory items travel along one or more conveyor segments, a given mobile robotic device can be controlled or instructed to rotate its attached conveyor component using its rotating head and, as a result, enabling sortation of the inventory item by changing the direction in which the inventory items are moving in the workspace. This can allow the mobile robotic device to align its conveyor attachment to another conveyor attached on another mobile robotic device to perform sortation of inventory items.

As described further herein, management of the inventory items in the inventory system may be provided by a centralized management module, which may be loosely analogously compared to an air traffic controller in an air traffic control system. Such a management module, among other capabilities, provides instructions to the mobile robotic devices and/or the conveyor attachments to enable certain tasks to be performed in the workspace of the inventory system. Examples of such tasks may include instructing mobile robotic devices to dock/attach to a conveyor attachment, instructing mobile robotic devices to move their conveyor attachments to various positions in the workspace, instructing mobile robotic devices to connect their conveyor attachments with other conveyor attachments attached to other mobile robotic devices, etc.

Figure 1B:
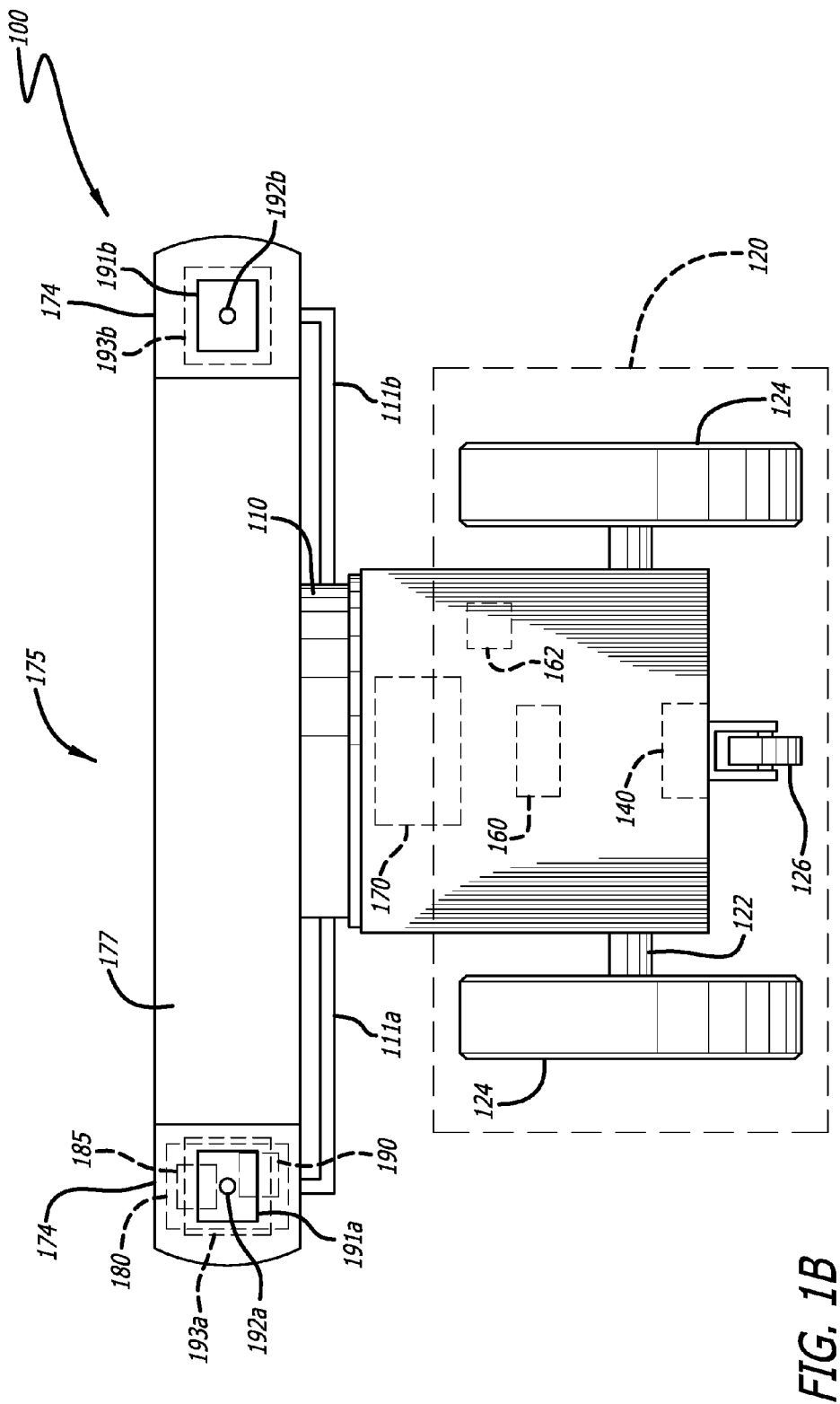

FIGS. 1A and 1B illustrate the components of a mobile robotic device 100. In particular, FIG. 1A illustrates a side view of an example mobile robotic device 100, and FIG. 1B illustrates a front view of the example mobile robotic device 100. As shown, the mobile robotic device 100 includes a rotating head 110, a drive module 120, and a control module 170. Additionally, the mobile robotic device 100 may include one or more sensors configured to detect or determine the location of the mobile robotic device 100. In the illustrated embodiment, the mobile robotic device 100 includes a position sensor 140, an obstacle sensor 160, and an identification signal transmitter 162. It is appreciated that other types of sensors may be included in the mobile robotic device 100 and still be within the scope of the disclosure.

The rotating head 110, in at least one embodiment of mobile robotic device 100, couples the mobile robotic device 100 to a frame 174 of a conveyor 175. In at least an embodiment, the rotating head 110 can be integrally attached to the frame 174 of the conveyor 175, or can be removably attached/docked to the frame 174 of the conveyor 175. When attached, the rotating head 110 can lift and/or rotate the conveyor 175 relative to the mobile robotic device 100. Also, the mobile robotic device 100 can transport the conveyor 175 throughout a workspace of an inventory system as described further herein. The conveyor 175 may include actuators or motors as described further below.

Rotating head 110 may additionally allow mobile robotic device 100 to maneuver the conveyor 175, such as by lifting the frame 174 of the conveyor 175, rotating the frame 174 of the conveyor 175, and/or moving the frame 174 of the conveyor 175 in any other appropriate manner. To enable moving the frame of the conveyor 175, the rotating head 110 may include one or more components such as linear/rotating actuators, motors (e.g., electric, pneumatic, hydraulic, etc.), shafts, gears, pulleys, wheels, racks and pinions, etc. In one embodiment, an actuator (not shown) is capable of adjusting the position or orientation of the rotating head 110 in one or more suitable ways to facilitate docking to the frame 174. The actuator of the rotating head 110 may include any appropriate components for moving the rotating head 110 or otherwise adjusting the position or orientation of the rotating head 110. In an example, a motorized shaft (not shown) is connected to the actuator and configured to attach to the center of the rotating head 110. The motorized shaft is operable to lift the rotating head 110 as appropriate for docking with the frame 174 of the conveyor 175, and also operable to rotate the rotating head 110 along a vertical axis through a center of the rotating head 110 of the mobile robotic device 100. The rotating head 110 may also include any appropriate combination of components, such as ribs, spikes, flanges, and/or corrugations, to further facilitate docking or attaching to the frame 174 of the conveyor 175. For example, the rotating head 110 may include supporting arms 111a and 111b that support the frame 174 of the conveyor 175 and enable the rotating head 110 to be removably docked or attached to the frame 174 of the conveyor 175.

The conveyor 175, as illustrated, may include a conveyor belt 177, a conveyor motor 176, and one or more conveyor cylinders 178 and 179 that are configured to enable the conveyor belt 177 to rotate in a particular direction (e.g., by rotating around the cylinders). In the embodiment shown in FIG. 1A, the conveyor motor 176 may be coupled to the conveyor cylinder 178, and when activated, can rotate the conveyor cylinder 178 in a clockwise or counter-clockwise direction. The rotational movement of the conveyor cylinder 178 causes the conveyor belt 177 to move in a likewise direction rotating around the conveyor cylinders in a cyclic manner. The conveyor motor 176 may any type of motor including, for example, a brushless motor, brushed motor, DC motor, AC motor, universal AC-DC motor, switched reluctance motor, fixed speed motor, induction motor, etc. The conveyor 175 may be any appropriate size or dimension. In an embodiment, the conveyor 175 may have a length of approximately 10 feet long.

A power module 180 may supply power to the conveyor 175. In the embodiment illustrated in FIGS. 1A and 1B, the power module 180 may include a conveyor controller 185 and an external power connector 190. The conveyor controller 185 may receive and/or transmit control signals from another conveyor and/or a remote management module (as described further herein). Among the types of control signals, a motor identification signal that identifies the conveyor motor 176, command signals, and/or control signals may be transmitted and/or received by the conveyor controller 185. The conveyor controller 185 may include any appropriate hardware and/or software suitable to provide the described functionality. In at least one embodiment, the conveyor controller 185 includes a microprocessor programmed to provide the described functionality.

Power may be transmitted, via at least one connector as described further below, through the conveyor 175 to supply power to the conveyor motor 176 and/or other components of the conveyor 175. When multiple conveyors are connected to each other via such a connector, power and/or control or other signals may be transferred from one conveyor to another conveyor via the connector. In an embodiment, the conveyor 175 may include the external power connector 190 (e.g., included in the power module 180) that is capable of interfacing with an external power source. In an example, this external power source could be a component of a busway power distribution system, which refers to an electrical distribution system consisting of bus bars in a protective enclosure, including straight lengths, fittings, devices, and accessories. One advantage of a busway is the relative ease in which busway sections are connected together to enable electrical power to be supplied to any area of a physical space.

As mentioned above, the mobile robotic device 100 may include at least one connector that facilitates coupling with other conveyors that may be provided by other mobile robotic devices. Such a connector, as illustrated, may include a connector base 191a and a protruding connector portion 192a. The mobile robotic device 100, as further illustrated, may include a connector receptacle 193a that has an opening which is configured to receive a protruding connector portion 192a of another conveyor (e.g., similar to the conveyor 175). The protruding connector portion 192a may be adapted for engagement in the opening of the connector receptacle 193. In this manner, multiple mobile robotic devices may link up, each providing a respective conveyor section, and forming longer conveyors to facilitate more efficient and/or configurable transporting of inventory items in the workspace. When connected, the respective belts of the conveyors are fixed in a coplanar orientation in an embodiment. In an example, the connector may comprise a type of interlocking connector such as a blind mate connector that provides a mating action that occurs via a sliding or snapping movement when connecting with a connector receptacle, and has self-aligning features which further allows a small misalignment or tolerance when mating with the receptacle (and still maintaining the connection). As discussed above, the connector may transmit power to portions of the conveyor 175. Further, control or other signals may be transmitted to each individually identified motor (e.g., identified by a motor identification signal discussed above) over the power connection provided by the connector, which in an embodiment can minimize a number of discrete connection points.

As further illustrated in FIG. 1B, the conveyor 175 may include a pair of connectors and a pair of connector receptacles. Opposite to the connector corresponding to the connector base 191a and the protruding connector portion 192a, another connector with a connector base 191b and a protruding connector portion 192b is provided. Similarly, opposite to the connector receptacle 193a, a connector receptacle 193b is provided. In comparison to providing a single connector or a single connector receptacle, by having a pair of connectors, the mobile robotic device may more securely connect to another similar mobile robotic device with corresponding pairs of connectors and/or connector receptacles. Moreover, it is appreciated that although the connectors and connector receptacles are illustrated at different ends of the conveyor 175, in at least one embodiment, one or more connectors and/or connector receptacles may be configured along the side(s) of the conveyor 175 to enable connecting with another conveyor to facilitate one or more 'L" shaped turns in the aggregate conveyor formed by one or more connected conveyor segments.

The drive module 120 propels the mobile robotic device 100 and, when the mobile robotic device 100 and the conveyor 175 are docked, the conveyor 175. The drive module 120 may represent any appropriate collection of components operable to propel the drive module 120. For example, in the illustrated embodiment, the drive module 120 includes a motorized axle 122, a pair of motorized wheels 124, and a pair of stabilizing wheels 126. In an example, one motorized wheel 124 is located at each end of motorized axle 122, and one stabilizing wheel 126 is positioned at each forward and rearward end of the mobile robotic device 100.

The drive module 120 may be configured to move the mobile robotic device 100 in any appropriate manner. For example, in the illustrated embodiment, the motorized wheels 124 are operable to rotate in a first direction to move the mobile robotic device 100 in a forward direction. The motorized wheels 124 are also operable to rotate in a second direction to move the mobile robotic device 100 in a backward direction. Further, the drive module 120 may also be configured to rotate the mobile robotic device 100 by rotating the motorized wheels 124 in different directions from one another or by rotating the motorized wheels 124 at different speeds from one another.

The position sensor 140 may comprise one or more sensors, detectors, or other components suitable for determining the location of the mobile robotic device 100 in any appropriate manner. For example, the position sensor 140 may include an imaging device or camera and suitable image processing and/or video processing components (e.g., a DSP, ASIC, FPGA, etc.), to allow the position sensor 140 to detect objects or markings within the camera's field of view that may indicate a relative position or location within the workspace and aids in navigation when moving within workspace. The control module 170 may store location information that the position sensor 140 updates as position sensor 140 detects the objects or markings. In an embodiment, the workspace associated with the inventory system includes a number of fiducial marks that mark points on a two-dimensional grid that covers all or a portion of the workspace. The position sensor 140 may therefore detect such fiducial marks and the control module 170 may store location information for the detected fiducial marks. A fiducial mark may refer to an object placed in the field of view of an imaging system (e.g., a camera used by the mobile robotic device) which appears in the image produced, for use as a point of reference or a measure (e.g., for determining a location within the workspace).

The obstacle sensor 160 represents one or more sensors capable of detecting objects located in one or more different directions in which mobile robotic device 100 is capable of moving. The obstacle sensor 160 may utilize any appropriate components and techniques, including optical, radar, sonar, pressure-sensing and/or other types of detection devices appropriate to detect objects located in the direction of travel of mobile robotic device 100. In at least one embodiment, the obstacle sensor may transmit information describing objects it detects to the control module 170 to be used by the control module 170 to identify obstacles and to take appropriate remedial actions to prevent the mobile robotic device 100 from colliding with obstacles and/or other objects.

The obstacle sensor 160 may also detect signals transmitted by other mobile robotic devices 100 operating in the vicinity of the illustrated mobile robotic device 100. For example, in at least one embodiment of an inventory system, one or more mobile robotic devices 100 may include an identification signal transmitter 162 that transmits an identification signal. The identification signal indicates to other mobile robotic devices 100 that the object transmitting the identification signal is a respective mobile robotic device. The identification signal transmitter 162 may be capable of transmitting infrared, ultraviolet, audio, visible light, radio, and/or other suitable signals that indicate to recipients that the transmitting device is a mobile robotic device 100.

Additionally, the obstacle sensor 160 may also be capable of detecting state information transmitted by other mobile robotic devices 100. For example, in at least one embodiment, the identification signal transmitter 162 may be capable of including state information relating to the mobile robotic device 100 in the transmitted identification signal. This state information may include, but is not limited to, the position, velocity, direction, and the braking capabilities of the transmitting mobile robotic device 100. In at least one embodiment, the mobile robotic device 100 may use the state information transmitted by other mobile robotic devices to avoid collisions when operating in close proximity with those other mobile robotic devices.

The control module 170 monitors and/or controls operation of the drive module 120 and the rotating head 110. The control module 170 may also receive information from sensors such as position sensor 140 and adjust the operation of drive module 120 and/or other components of the mobile robotic device 100 based on this information. In some embodiments, the mobile robotic device 100 may be configured to communicate with a remote management device of the inventory system, and the control module 170 may receive commands transmitted to the mobile robotic device 100 and communicate information back to the remote management device utilizing communication components of the mobile robotic device. The control module 170 may include any appropriate hardware and/or software suitable to provide the described functionality. In at least one embodiment, the control module 170 includes a microprocessor programmed to provide the described functionality. Additionally, the control module 170 may include all or portions of the drive module 120, the position sensor 140, and/or share components with any of these components of the mobile robotic device 100.

The control module 170 may communicate with the conveyor controller 185 as described before in order to send commands and control the operation of the conveyor 175. In another example, the control module 170 may instead communicate with the aforementioned remote management device of the inventory system to request operations for the conveyor 175 to be performed. Such requested operations may include powering on or off the conveyor 175, activating or deactivating the conveyor motor 176, and/or generally controlling various components of the conveyor 175 as appropriate.

Moreover, in at least one embodiment, the control module 170 may include hardware and software located in components that are physically distinct from the device that houses drive module 120, and/or the other components of the mobile robotic device 100 described above. For example, in at least one embodiment, each mobile robotic device operating in inventory system may be associated with a software process (referred to here as a "mobile agent") operating on a server that is in communication with the device that houses drive module 120, and other appropriate components of the mobile robotic device 100. This mobile agent may be responsible for requesting and receiving tasks, requesting and receiving routes, transmitting state information associated with the mobile robotic device 100, and/or otherwise interacting with remote management module 215 and other components of inventory system on behalf of the device that physically houses drive module 120, and the other appropriate components of the mobile robotic device 100. For the purposes of the description herein, the term "mobile robotic device" includes software and/or hardware, such as agent processes, that provides the described functionality on behalf of the mobile robotic device 100 but that may be located in physically distinct devices from the drive module 120, and/or the other components of the mobile robotic device 100 described above.

Figure 2:
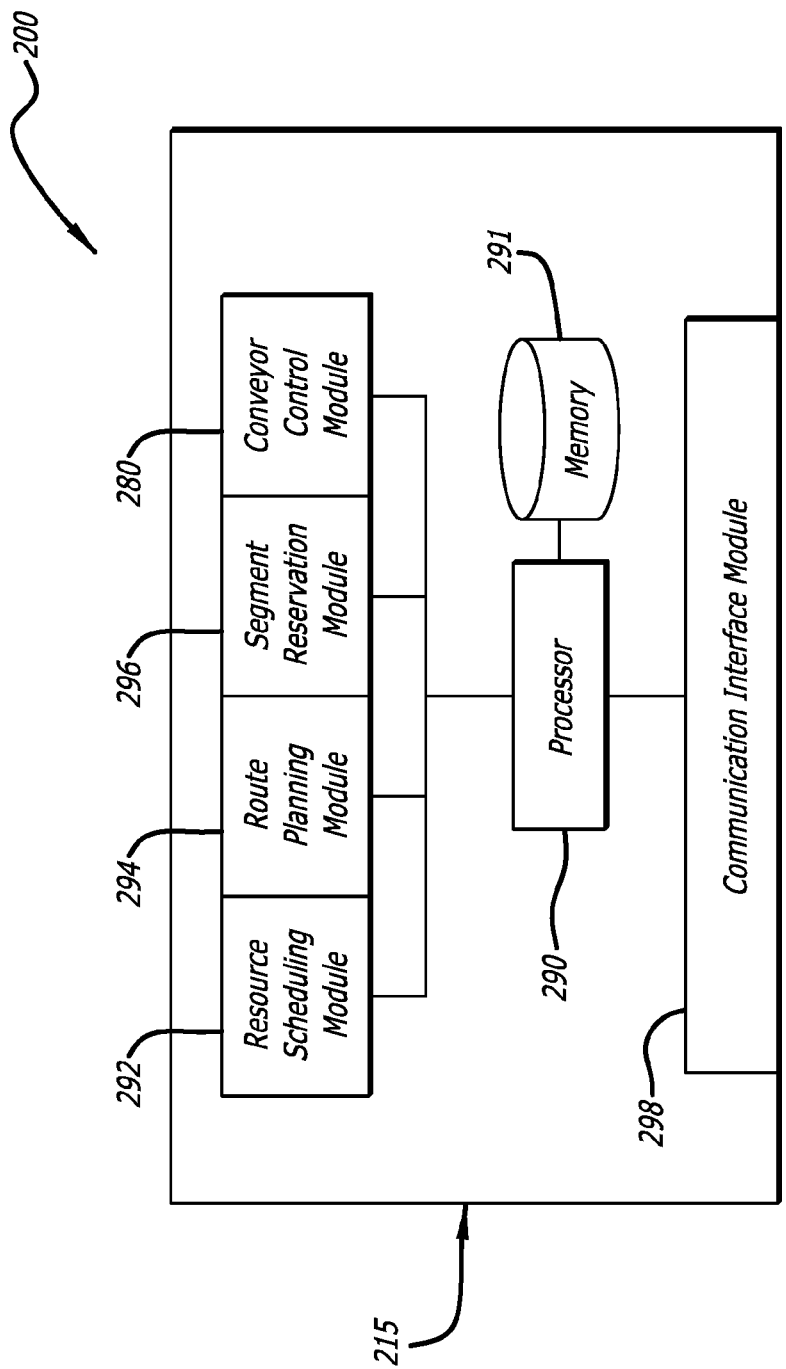
FIG. 2 illustrates example components of a management module in accordance with some embodiments.

FIG. 2 illustrates example components 200 of a management module 215 in accordance with some embodiments. As shown, the example embodiment includes a resource scheduling module 292, a route planning module 294, a segment reservation module 296, a conveyor control module 280, a communication interface module 298, a processor 290, and a memory 291. The management module 215 may represent a single component, multiple components located at a central location within the inventory system, or multiple components distributed throughout the inventory system. For example, management module 215 may represent components of one or more mobile robotic devices that are capable of communicating information between the mobile robotic devices and coordinating the movement of the mobile robotic devices within the workspace. It is appreciated that the management module 215 may include any appropriate combination of hardware and/or software suitable to provide the described functionality herein.

The processor 290 is operable to execute instructions associated with the functionality provided by management module 215. The processor 290 may comprise one or more computers, dedicated microprocessors, or other processing devices capable of communicating electronic information. Examples of the processor 290 include one or more application-specific integrated circuits (ASICs), field-programmable gate arrays (FPGAs), digital signal processors (DSPs) and any other suitable processors.

The memory 291 stores processor instructions, inventory requests, reservation information, state information for the various components of inventory system and/or any other appropriate values, parameters, or information utilized by management module 215 during operation. The memory 291 may represent any collection and arrangement of volatile or non-volatile, local or remote devices suitable for storing data. Examples of the memory 291 include, but are not limited to, random access memory (RAM) devices, read only memory (ROM) devices, magnetic storage devices, optical storage devices, or any other suitable data storage devices.

The resource scheduling module 292 processes received inventory requests and generates one or more assigned tasks to be completed by the components of inventory system. The resource scheduling module 292 may also select one or more appropriate components for completing the assigned tasks and, using the communication interface module 298, communicate the assigned tasks to the relevant components. Additionally, the resource scheduling module 292 may also be responsible for generating assigned tasks associated with various management operations, such as prompting mobile robotic devices to recharge batteries or have batteries replaced, instructing inactive mobile robotic devices to park in a location outside the anticipated traffic flow or a location near the anticipated site of future tasks, directing mobile robotic devices selected for repair or maintenance to move towards a designated maintenance station, instructing mobile robotic devices to move to a destination location, instructing mobile robotic devices to retrieve conveyor attachments that may be stored in a storage location in the workspace, instructing mobile robotic devices that include conveyor attachments to connect to other mobile robotic devices that also include conveyor attachments so as to form one or more various conveyor segments, instructing mobile robotic devices to operate their attached conveyor attachments (e.g., powering on or off, moving the conveyor belt in a particular direction, adjusting the conveyor belt speed, stopping the conveyor belt, etc.), and/or instructing the mobile robotic devices to perform tasks in connection with sortation, etc.

The route planning module 294 receives route requests from the mobile robotic devices. These route requests identify one or more destinations associated with a task the requesting mobile robotic device is executing. In response to receiving a route request, the route planning module 294 generates a path to one or more destinations identified in the route request. The route planning module 294 may implement any appropriate algorithms utilizing any appropriate parameters, factors, and/or considerations to determine the appropriate path. After generating an appropriate path, the route planning module 294 transmits a route response identifying the generated path to the requesting mobile robotic device using communication interface module 298.

The segment reservation module 296 receives reservation requests from mobile robotic devices attempting to move along paths generated by route planning module 294. These reservation requests, in an example, request the use of a particular portion of workspace (referred to herein as a "segment") to allow the requesting mobile robotic device 100 to avoid collisions with other mobile robotic devices while moving across the reserved segment. In response to received reservation requests, the segment reservation module 296 transmits a reservation response granting or denying the reservation request to the requesting mobile robotic device 100 using the communication interface module 298.

The conveyor control module 280 transmits control and/or commands to the mobile robotic device 100 for controlling and operating the conveyor 175. For example, the mobile robotic device 100 (e.g., via the control module 170) may transmit a request to power on the conveyor 175 and operate the conveyor motor 176. In an embodiment, the conveyor controller 185 may receive corresponding commands from the conveyor control module 280 and then process the received commands for performing certain operations on the conveyor 175. Such commands, for example, may instruct a conveyor to turn on its motor in order to rotate a conveyor belt in a particular direction, change the speed of the conveyor rotation, change direction of conveyor rotation, stop the conveyor, rotate the conveyor via rotating head, among others. When a conveyor connects with another conveyor, a signal may be transmitted from a conveyor controller at a mobile robotic device to the conveyor control module 280 notifying that the respective conveyor sections are now coupled together. In an example, the respective conveyors and their associated mobile robotic devices that are included as part of coupled conveyor sections may be tracked and controlled by the conveyor control module 280.

Communication interface module 298 facilitates communication between the management module 215 and other components of inventory system, including reservation responses, reservation requests, route requests, route responses, task assignments and conveyor control signals. These reservation responses, reservation requests, route requests, route responses, task assignments and conveyor control signals may represent communication of any form appropriate based on the capabilities of the management module 215 and may include any suitable information. Depending on the configuration of the management module 215, communication interface module 298 may be responsible for facilitating either or both of wired and wireless communication between the management module 215 and the various components of inventory system. In at least one embodiment, the management module 215 may communicate using communication protocols such as 802.11, Bluetooth, or Infrared Data Association (IrDA) standards, NFC, among other standards, etc. Furthermore, the management module 215 may, in at least one embodiment, represent a portion of the mobile robotic device 100 or other components of inventory system. In such embodiments, communication interface module 298 may facilitate communication between management module 215 and other parts of the same system component.

The resource scheduling module 292, the route planning module 294, the segment reservation module 296, the conveyor control module 280, and the communication interface module 298 may each represent any appropriate hardware and/or software suitable to provide the described functionality. In addition, as noted above, the management module 215 may, in at least one embodiment, represent multiple different discrete components and any or all of the resource scheduling module 292, the route planning module 294, the segment reservation module 296, the conveyor control module 280, and the communication interface module 298 may represent components physically separate from the remaining elements of the management module 215. Moreover, any two or more of the resource scheduling module 292, the route planning module 294, the segment reservation module 296, the conveyor control module 280, and the communication interface module 298 may share common components. For example, in at least one embodiment, the resource scheduling module 292, the route planning module 294, the segment reservation module 296, and the conveyor control module 280 represent computer processes executing on the processor 290 and the communication interface module 298 comprises a wireless transmitter, a wireless receiver, and a related computer process executing on the processor 290.

Figure 3:
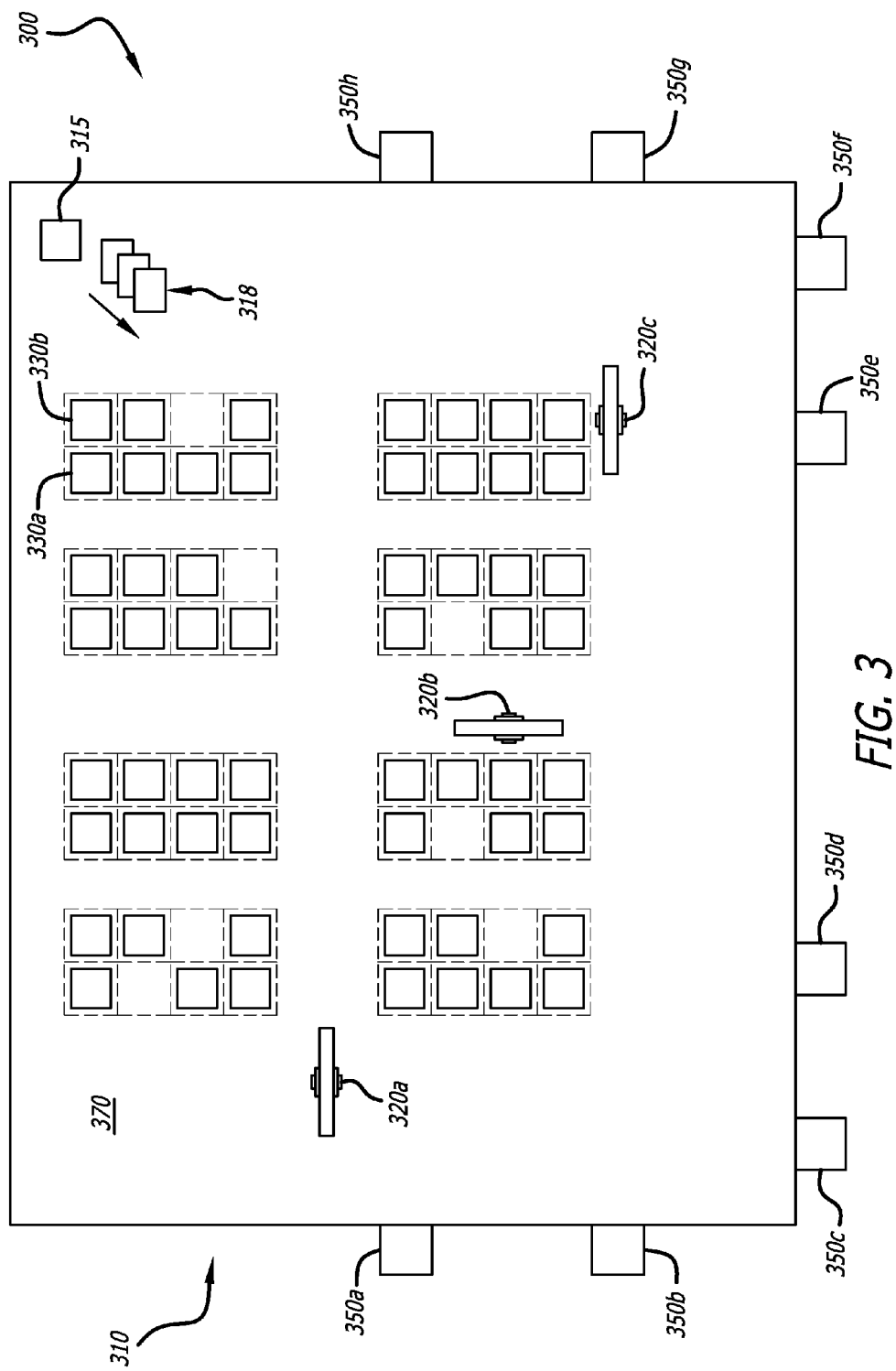
FIG. 3 illustrates an example of an inventory system in accordance with some embodiments.

FIG. 3 illustrates an example 300 of an inventory system 310. The inventory system 310 includes a management module 315, one or more mobile robotic devices including mobile robotic devices 320*a*, 320*b* and 320*c*, one or more inventory holders including inventory holders 330*a* and 330*b*, and one or more inventory stations including inventory station 350*a*, 350*b*, 350*c*, 350*d*, 350*e*, 350*f*, 350*g*, and 350*h*. In an example, the mobile robotic devices transport the inventory holders 330*a* and 330*b* between points within a workspace 370 in response to commands communicated by the management module 315. Each inventory holder 330*a* and 330*b* stores one or more types of inventory items. The inventory system 310 therefore is capable of moving inventory items between locations within the workspace 370 to facilitate the entry, processing, and/or removal of inventory items from inventory system 310 and the completion of other tasks involving inventory items. As illustrated in the example of FIG. 3, the mobile robotic devices 320*a*, 320*b* and 320*c* each include a respective conveyor, which may coincide with the description of the conveyor 175 as described herein in FIGS. 1A and 1B. The mobile robotic devices 320*a*, 320*b* and 320*c* may utilize their respective conveyors to facilitate moving inventory items between locations within the workspace 370.

The management module 315 assigns tasks to appropriate components of the inventory system 310 and coordinates operation of the various components in completing the tasks. These tasks may relate not only to the movement and processing of inventory items, but also to the management and maintenance of the components of inventory system 310. For example, management module 315 may assign portions of the workspace 370 as parking spaces for mobile robotic devices 320, the scheduled recharge or replacement of mobile robotic device batteries, the storage of inventory holders 330, or any other operations associated with the functionality supported by inventory system 310 and its various components. Management module 315 may select components of inventory system 310 to perform these tasks and communicate appropriate commands and/or data to the selected components to facilitate completion of these operations. Although shown in FIG. 3 as a single, discrete component, management module 315 may represent multiple components and may represent or include portions of mobile robotic devices 320 or other elements of inventory system 310. As a result, any or all of the interaction between a particular mobile robotic device and the management module 315 that is described herein may, in at least one embodiment, represent peer-to-peer communication between a mobile robotic device and one or more other mobile robotic devices. The contents and operation of an example embodiment of management module 315 were discussed herein in FIG. 2.

The mobile robotic devices in FIG. 3 can move the inventory holders 330a and 330b between locations within workspace 370 using their respective conveyors. In a particular embodiment of the inventory system 310, the mobile robotic devices represent independent, self-powered devices as described in FIGS. 1A and 1B that are configured to freely move about workspace 370. In alternative embodiments, the mobile robotic devices 320a, 320b and 320c represent elements of a tracked inventory system configured to move the inventory holders 330a and 330b along tracks, rails, cables, crane system, or other guidance or support elements traversing workspace 370. In this embodiment, the mobile robotic devices 320a, 320b and 320c may receive power and/or support through a connection to the guidance elements, such as a powered rail. Additionally, in at least one embodiment of inventory system 310 mobile robotic devices 320 may be configured to utilize alternative conveyance equipment to move within the workspace 370 and/or between separate portions of the workspace 370.

Additionally, the mobile robotic devices 320a, 320b and 320c may be capable of communicating with the management module 315 to receive information identifying selected inventory holders, transmit the locations of mobile robotic devices, or exchange any other suitable information to be used by the management module 315 or mobile robotic devices during operation. The mobile robotic devices 320a, 320b and 320c may communicate with the management module 315 wirelessly, using wired connections between mobile robotic devices 320 and management module 315, and/or in any other appropriate manner. For example, embodiments of a mobile robotic device may communicate with the management module 315 and/or with one another using 802.311, Bluetooth, or Infrared Data Association (IrDA) standards, or any other appropriate wireless communication protocol. Further, the management module 315 may include components of individual mobile robotic devices. Thus, communication between the management module 315 and a respective mobile robotic device may represent communication between components of the mobile robotic device. The mobile robotic devices 320 may be powered, propelled, and controlled in any suitable manner based on the configuration and characteristics of the inventory system 310.

The inventory holders 330a and 330b store one or more inventory items. In a particular embodiment, the inventory holders 330a and 330b include multiple storage bins with each storage bin capable of holding one or more types of inventory items. The inventory holders 330a and 330b are capable of being carried, rolled, and/or otherwise moved by mobile robotic devices 320. In at least one embodiment, the inventory holders 330a and 330b may provide additional propulsion to supplement that provided by mobile robotic device 320 when moving a particular inventory holder.

Inventory items represent any objects suitable for storage, retrieval, and/or processing in the inventory system 310. For the purposes of this description, inventory items may include any one or more objects of a particular type that are stored in the inventory system 310. Thus, a particular inventory holder is currently storing a particular inventory item if the inventory holder 330 currently holds one or more units of that type. As one example, the inventory system 310 may represent a mail order warehouse facility, and inventory items may represent merchandise stored in the warehouse facility. During operation, mobile robotic devices 320a, 320b, and 320c may retrieve the inventory holders 330a and 330b containing one or more inventory items requested in an order to be packed for delivery to a customer or retrieve the inventory holders 330a and 330b carrying pallets containing aggregated collections of inventory items for shipment. Moreover, in at least one embodiment of the inventory system 310, boxes containing completed orders may themselves represent inventory items.

In at least one embodiment, the inventory system 310 may also include one or more inventory stations. As shown, the example inventory system 310 includes inventory stations 350a, 350b, 350c, 350d, 350e, 350f, 350g, and 350h. The aforementioned inventory stations represent locations designated for the completion of particular tasks involving inventory items. Such tasks may include the removal of inventory items from inventory holders, the introduction of inventory items into inventory holders, the counting of inventory items in inventory holders, the decomposition of inventory items (e.g. from pallet-sized or case-sized groups to individual inventory items), and/or the processing or handling of inventory items in any other suitable manner. In at least one embodiment, the inventory stations may just represent the physical locations where a particular task involving inventory items can be completed within the workspace 370. In alternative embodiments, the inventory stations may represent both the physical location and also any appropriate equipment for processing or handling inventory items, such as scanners for monitoring the flow of inventory items in and out of the inventory system 310, communication interfaces for communicating with the management module 315, and/or any other suitable components. The inventory stations may be controlled, entirely or in part, by human operators or may be fully automated. Moreover, the human or automated operators of the inventory stations may be capable of performing certain tasks to inventory items, such as stowing, picking, packing or counting inventory items, as part of the operation of the inventory system 310.

In an embodiment, the workspace 370 represents an area associated with the inventory system 310 in which mobile robotic devices can move and/or inventory holders 330 can be stored. For example, workspace 370 may represent all or part of the floor of a mail-order warehouse in which inventory system 310 operates. Although FIG. 3 shows, for the purposes of illustration, an embodiment of the inventory system 310 in which workspace 370 includes a fixed, predetermined, and finite physical space, particular embodiments of inventory system 310 may include mobile robotic devices and inventory holders that are configured to operate within a workspace that is of variable dimensions and/or an arbitrary geometry. In addition, while FIG. 3 illustrates a particular embodiment of the inventory system 310 in which the workspace 370 is entirely enclosed in a building or similar physical structure, alternative embodiments may utilize workspaces in which some or all of the workspace 370 is located outdoors, within a vehicle or vessel (e.g., a cargo ship), or otherwise unconstrained by a fixed structure.

Moreover, in at least one embodiment, the workspace 370 may include multiple portions that are physically separated from one another, including but not limited to separate floors, rooms, buildings, and/or portions divided in any other suitable manner. The mobile robotic devices 320 may be configured to utilize alternative conveyance equipment such as vertical or horizontal conveyors, trucks, ferries, gondolas, escalators, and/or other equipment suitable to move the mobile robotic devices between separate portions of the workspace 370.

In operation, the management module 315 selects appropriate components to complete particular tasks and transmits one or more task assignments 318 to the selected components to trigger completion of the relevant tasks. Each task assignment 318 defines one or more tasks to be completed by a particular component. These tasks may relate to the retrieval, storage, replenishment, and counting of inventory items and/or the management of mobile robotic devices, inventory holders, inventory stations and other components of the inventory system 310. Depending on the component and the task to be completed, a particular task assignment 318 may identify locations, components, and/or actions associated with the corresponding task and/or any other appropriate information to be used by the relevant component in completing the assigned task.

In at least one embodiment, the management module 315 generates the task assignments 318 based at least in part on inventory requests that the management module 315 receives from other components of the inventory system 310 and/or from external components in communication with the management module 315. These inventory requests identify particular operations to be completed involving inventory items stored or to be stored within the inventory system 310 and may represent communication of any suitable form. For example, in at least one embodiment, an inventory request may represent a shipping order specifying particular inventory items that have been purchased by a customer and that are to be retrieved from the inventory system 310 for shipment to the customer. The management module 315 may also generate the task assignments 318 independently of such inventory requests, as part of the overall management and maintenance of the inventory system 310. For example, the management module 315 may generate the task assignments 318 in response to the occurrence of a particular event (e.g., in response to a mobile robotic device requesting a space to park), according to a predetermined schedule (e.g., as part of a daily start-up routine), or at any appropriate time based on the configuration and characteristics of inventory system 310. After generating one or more task assignments 318, the management module 315 transmits the generated task assignments 318 to appropriate components for completion of the corresponding task. The relevant components then execute their assigned tasks.

With respect to mobile robotic devices, the management module 315 may, in at least one embodiment, communicate task assignments 318 to selected mobile robotic devices 320a, 320b, and/or 320c that identify one or more destinations for the selected mobile robotic devices 320. The management module 315 may select a respective mobile robotic device to assign the relevant task based on the location or state of the selected mobile robotic device, an indication that the selected mobile robotic device has completed a previously-assigned task, a predetermined schedule, and/or any other suitable consideration. These destinations may be associated with an inventory request the management module 315 is executing or a management objective the management module 315 is attempting to fulfill. For example, the task assignment may define the location of an inventory holder to be retrieved, an inventory station to be visited, a storage location where the mobile robotic device should park until receiving another task, or a location associated with any other task appropriate based on the configuration, characteristics, and/or state of the inventory system 310, as a whole, or individual components of the inventory system 310. For example, in at least one embodiment, such decisions may be based on the popularity of particular inventory items, the staffing of a particular inventory station, the tasks currently assigned to a particular mobile robotic device, and/or any other considerations.

As part of completing these tasks, in the example shown in FIG. 3, the mobile robotic devices 320a, 320b, and 320c may dock with conveyors 175 and transport conveyors within workspace 370. The mobile robotic devices 320a, 320b, and 320c may dock with the conveyors by connecting to, lifting, and/or otherwise interacting with the conveyors in any other suitable manner so that, when docked, the mobile robotic devices 320a, 320b, and 320c are coupled to and/or support the conveyors and can move the conveyors within workspace 370.

The management module 315, in at least one embodiment, may plan the paths upon which mobile robotic devices travel when moving within the workspace 370 and for allocating use of a portion of the workspace 370 to a particular mobile robotic device for purposes of completing an assigned task. In such embodiments, the mobile robotic devices may, in response to being assigned a task, request a path to a particular destination associated with the task. A mobile robotic device may, in other embodiments, generate its own path(s).

In an embodiment, the management module 315 may select a path between the current location of the requesting mobile robotic device and the requested destination and communicate information identifying this path to the mobile robotic device. For example, the management module 315 may utilize knowledge of current congestion, historical traffic trends, task prioritization, and/or other considerations to select an optimal path for the requesting mobile robotic device 320 to take in getting to the destination. Additionally, in planning the path (or in assigning tasks), the management module 315 may make informed decisions regarding the use of lifts, ramps, tunnels, and/or other conveyance equipment or features of the workspace 370 to facilitate the movement of the relevant mobile robotic device.

After receiving a path from the management module 315, the requesting mobile robotic device 320 may then move to the destination, traversing the path in a segment-by-segment manner. In an embodiment, before moving along a particular segment, the mobile robotic device may request permission to use the segment from the management module 315. The management module 315 may reserve the segment for use by the requesting mobile robotic device.

Figure 4:
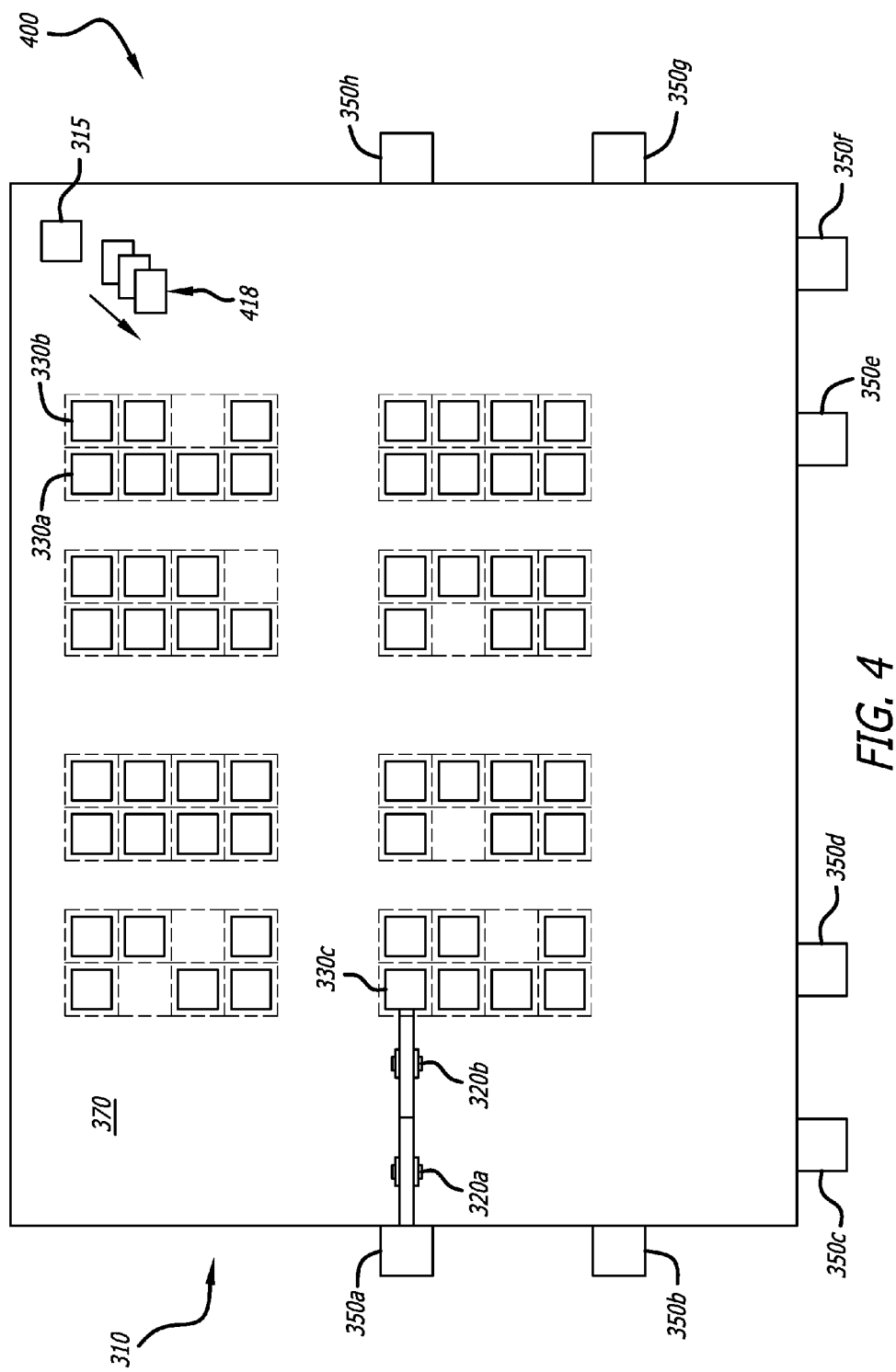
FIG. 4 illustrates an example of the inventory system in accordance with some embodiments.

FIG. 4 illustrates an example 400 of the inventory system 310 in accordance with some embodiments. The inventory system 310 illustrated in FIG. 4 is the same as the inventory system 310 described in FIG. 3. The example 400 in FIG. 4 shows that a connection is made between two respective conveyors that are docked to respective mobile robotic devices in the workspace 370.

The management module 315 may transmit task assignments 418 to each of mobile robotic devices 320a and 320b. As illustrated, the mobile robotic devices 320a and 320b include respective conveyors that may be connected to each other in accordance with the description of the mobile robotic device in FIGS. 1A and 1B. The task assignments 418 in this embodiment may include tasks that instruct the mobile robotic devices 320a, 320b to dock with respective conveyors 175. Alternatively, one or more of the mobile robotic devices 320a, 320b may have integrated conveyors 175. The task assignments 418 may also include tasks that instruct the mobile robotic device 320a to travel to a position adjacent to the inventory station 350a, and for the mobile robotic device 320*b* to travel to a position near the position of mobile robotic device 320*a* and adjacent inventory holder 330*c*. The task assignments 418 may also include tasks that instruct the mobile robotic devices 320*a*, 320*b* to connect their respective conveyors. The connected conveyors 175 of mobile robotic devices 320*a*, 320*b*, as shown, cover a distance that enables inventory items to travel along the connected conveyor span between the inventory station 350*a* and the inventory holder 330*c* in the workspace 370.

When the conveyors are connected together, each mobile robotic device may transmit a signal and/or information (e.g., identification information of the respective mobile robotic devices, identification of the respective conveyor motors, etc.) to the management module 315 confirming that such a connection was successfully made. Further, the management module 315 may store information indicating the relative position of the connected conveyors and their associated mobile robotic devices 320*a* and 320*b* in the workspace 370.

The management module 315, after receiving the signals indicating that the connection between the conveyors was successful, may further transmit another task assignment to operate the connected conveyors for enabling inventory items to be moved from the inventory station 350*a* to the inventory holder 330*c*. Alternatively, the management module 315 may transmit a task assignment to operate the connected conveyors for enabling inventory items to be moved from the inventory holder 330*c* to the inventory station 350*a*.

Figure 5:
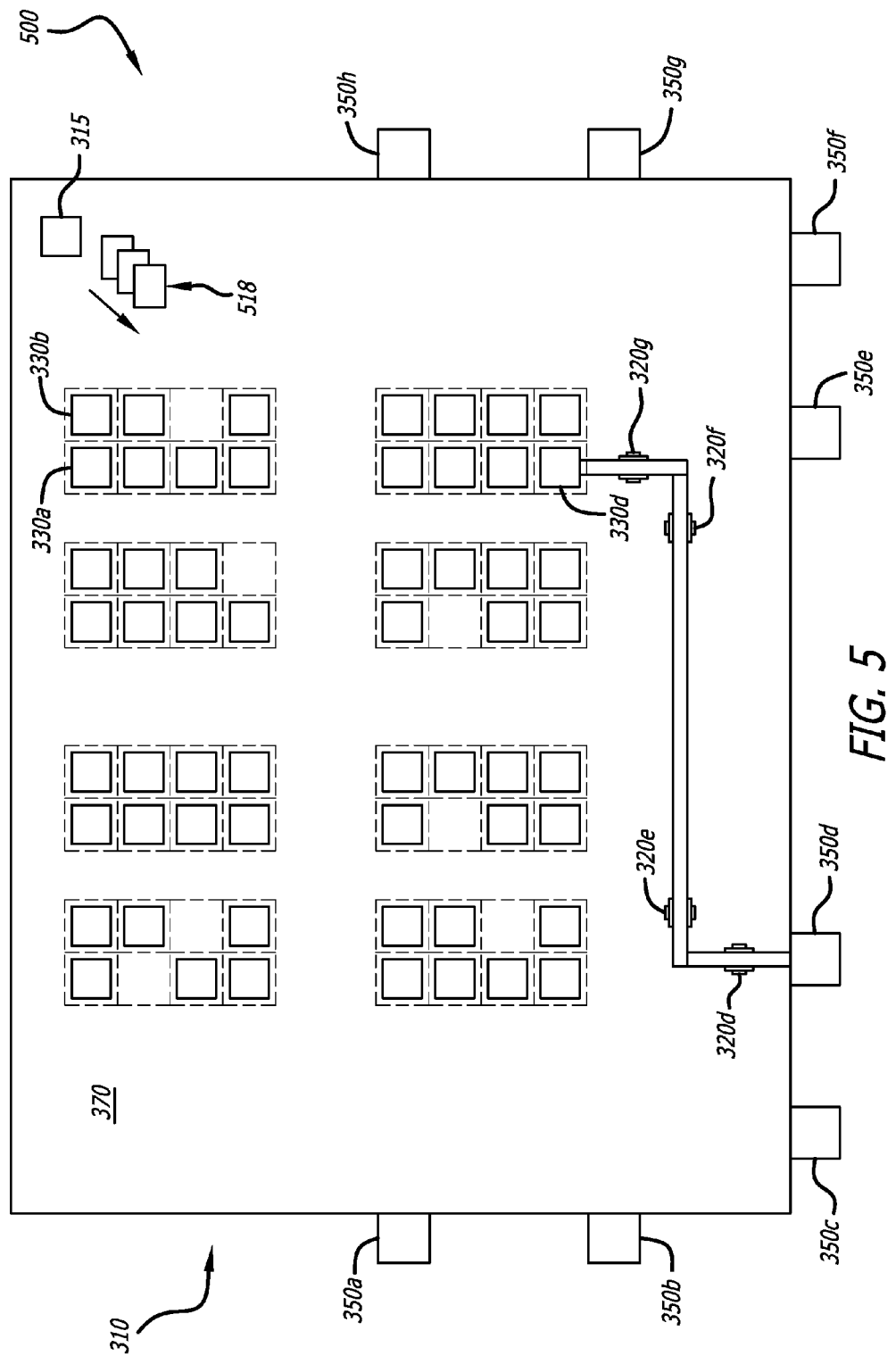
FIG. 5 illustrates an example of the inventory system in accordance with some embodiments.

FIG. 5 illustrates an example 500 of the inventory system 310 in accordance with some embodiments. The inventory system 310 illustrated in FIG. 5 is the same as the inventory system 310 described in FIG. 3. The example 500 in FIG. 5 shows that a connection is made between multiple conveyors that are docked to respective mobile robotic devices in the workspace 370.

In this example, multiple conveyors can be connected to each other to form a conveyor that has a greater length for covering a longer distance within the workspace 370. As discussed before, a conveyor may have a length of around 10 feet in an embodiment which can be docked to a single mobile robotic device. To enable greater lengths of conveyor (e.g., greater than 10 feet), two mobile robotic devices may support respective ends of a conveyor that is of such a length. In this example, a first mobile robotic device can be at a first end of the conveyor and a second mobile robotic device can be at a second end of the conveyor.

The management module 315 may transmit task assignments 518 to each of mobile robotic devices 320*d*, 320*e*, 320*f*, and 320*g*. The task assignments 518 in this embodiment may include tasks that instruct the mobile robotic devices 320*d*, 320*e*, 320*f* and 320*g* to dock with respective conveyors 175. Alternatively, one or more of the mobile robotic devices 320*d*, 320*e*, 320*f* and 320*g* may have integrated conveyors 175. The task assignments 518 in this embodiment may also include tasks that instruct the mobile robotic device 320*d* to move to a position adjacent to the inventory station 350*d* in the workspace 370. Inventory items, in this example, are to be moved between the inventory station 350*d* and an inventory holder 330*d*. However, a distance to reach these two respective endpoints in the workspace 370 may require using a conveyor which has a length such that more than a single mobile robotic device may be needed to dock with such a long conveyor. Thus, the task assignments 518 may also include tasks instructing the mobile robotic device 320*e* and the mobile robotic device 320*f* to dock at different ends of the long conveyor and to move to a position at one end of the conveyor docked to the mobile robotic device 320*d* that is situated adjacent to the inventory station 350*d*. This configuration may enable a human operator to place inventory items that come from the inventory station 350*d* from the adjacent conveyor and then place such items onto the long conveyor docked at one end to the mobile robotic device 320*e*. The inventory items may then travel along the long conveyor to its other end docked to the mobile robotic device 320*f*. Alternatively, the conveyors may be connected, via connectors described herein, such that inventory items may be moved between the conveyor docked to mobile robotic device 320*d* and the long conveyor docked to mobile robotic devices 320*e*, 320*f* without human intervention.

The task assignments 518 in this example may further include a task that instructs the mobile robotic device 320*g* with its docked conveyor to move to a position within the workspace 370 adjacent to the inventory holder 330*d*, and adjacent to another end of the aforementioned long conveyor docked to the mobile robotic device 320*f* at one end. At this end of the long conveyor, a human operator can place the inventory items onto the conveyor docked to the mobile robotic device 320*g*. Alternatively, the conveyors may be connected, via connectors described herein, such that inventory items may be moved between the conveyor docked to mobile robotic device 320*g* and the long conveyor docked to mobile robotic devices 320*e*, 320*f* without human intervention. The inventory items can then be moved to a location of the inventory holder 330*d* in the workspace 370 as it moves along the length of the conveyor docked to the mobile robotic device 320*g*.

It is appreciated that the above example also works in the opposite direction where inventory items stored at the inventory holder 330*d* are moved to the inventory station 350*d* via the conveyors docked to or integrated with the mobile robotic devices.

Figure 6A:
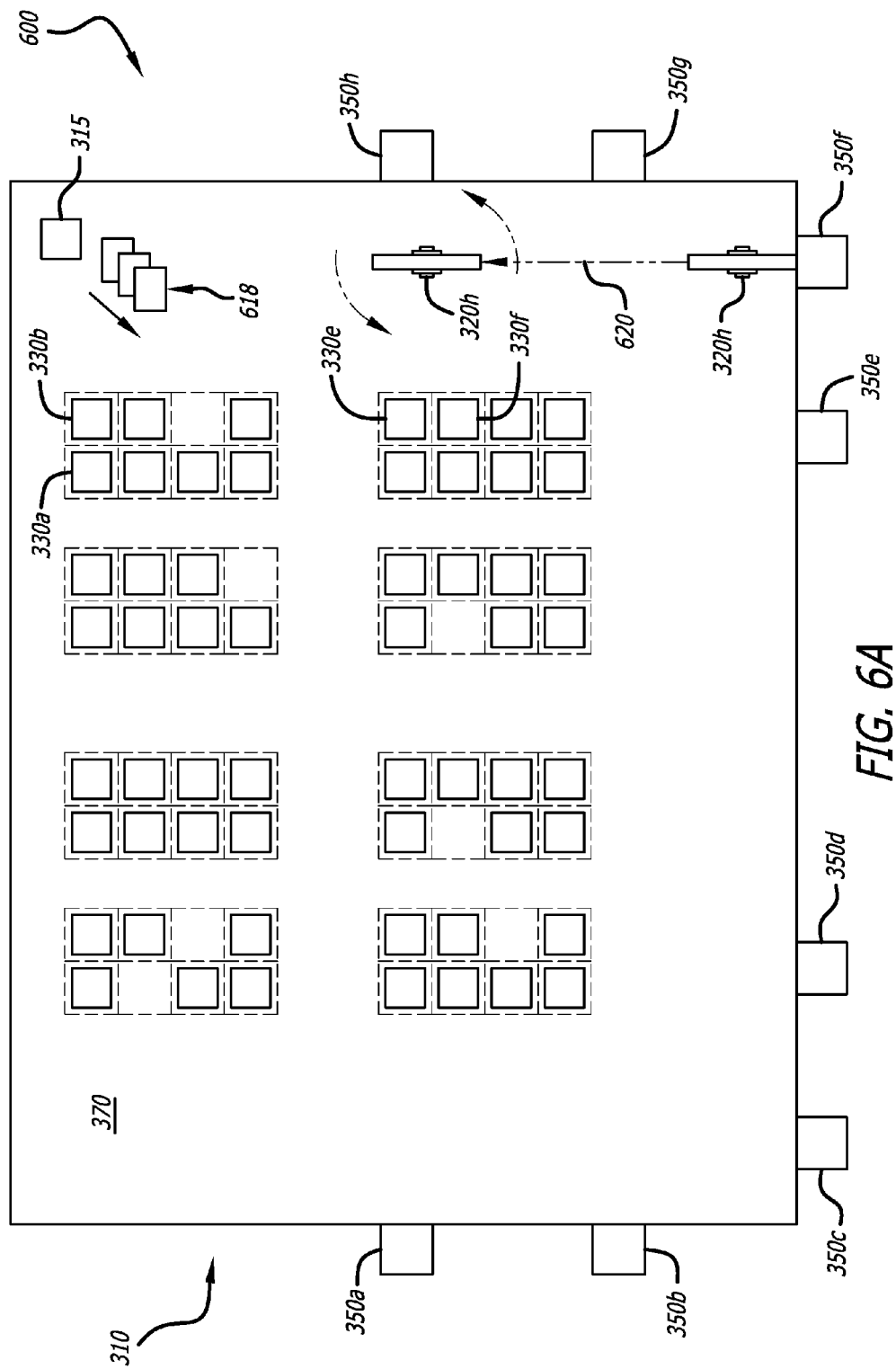

FIGS. 6A and 6B illustrate examples 600 and 650 of the inventory system 310 in accordance with some embodiments. The inventory system 310 illustrated in FIGS. 6A and 6B is the same as the inventory system 310 described in FIG. 3. The examples 600 and 650 show a mobile robotic device that may move in the workspace 370 and rotate a conveyor docked to the mobile robotic device. Manipulating the docked conveyor in these examples enables the mobile robotic device to perform sorting operations by rotating the conveyor at one inventory holder to interface with another inventory holder.

The management module 315 may transmit task assignments 618 to a mobile robotic device 320*h*. The task assignments 618 in this embodiment may include tasks that instruct the mobile robotic device 320*h* to dock with a respective conveyor 175. Alternatively, the mobile robotic device 320*h* may have an integrated conveyor 175. The task assignments 618 in this embodiment may also include tasks that instruct the mobile robotic device 320*h* to move to a position adjacent to an inventory station 350*f* in the workspace 370. Inventory items, in this example, are to be moved from the inventory station 350*f* to an inventory holder 330*e*. The task assignments 618 instruct the mobile robotic device 320*h* to move along a segment 620 within the workspace 370. Once at the new position at the end of the segment 620, the task assignments 618 may instruct the mobile robotic device 320*h* to rotate itself and/or the conveyor via the rotating head (e.g., as indicated by the dashed arrows in FIG. 6A) in order to deliver the inventory items to the inventory holder 330*e*.

The mobile robotic device 320h, based on the task assignments 618, moves along a segment 652 shown in FIG. 6B toward the inventory holder 330e so that its docked conveyor is adjacent to the inventory holder 330e. A human operator may then sort and pick out inventory items for storing in the inventory holder 330e, or this operation may be completed without human intervention. In an example, some of the inventory items that were moved by the mobile robotic device 320h are not intended to be stored at inventory holder 330e but at an inventory holder 330f instead. In the example of FIG. 6B, the mobile robotic device 320h may move itself and/or rotate its docked conveyor to be nearer a location of the inventory holder 330f The human operator can then pick the inventory items for storing in the inventory holder 330f, or this operation may be completed without human intervention.

Figure 7A:
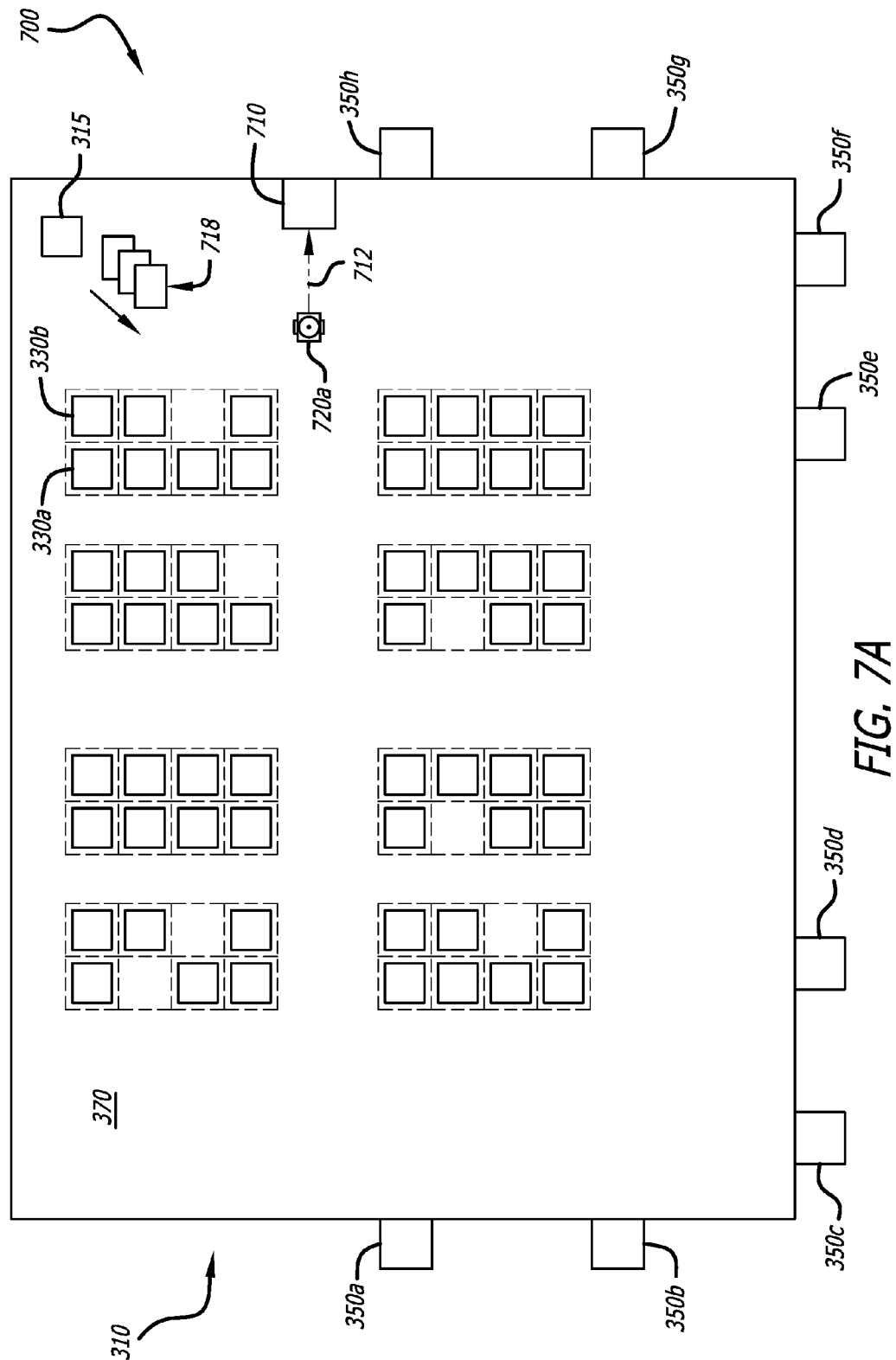
FIGS. 7A and 7B illustrate examples of the inventory system in accordance with some embodiments.
Figure 7B:
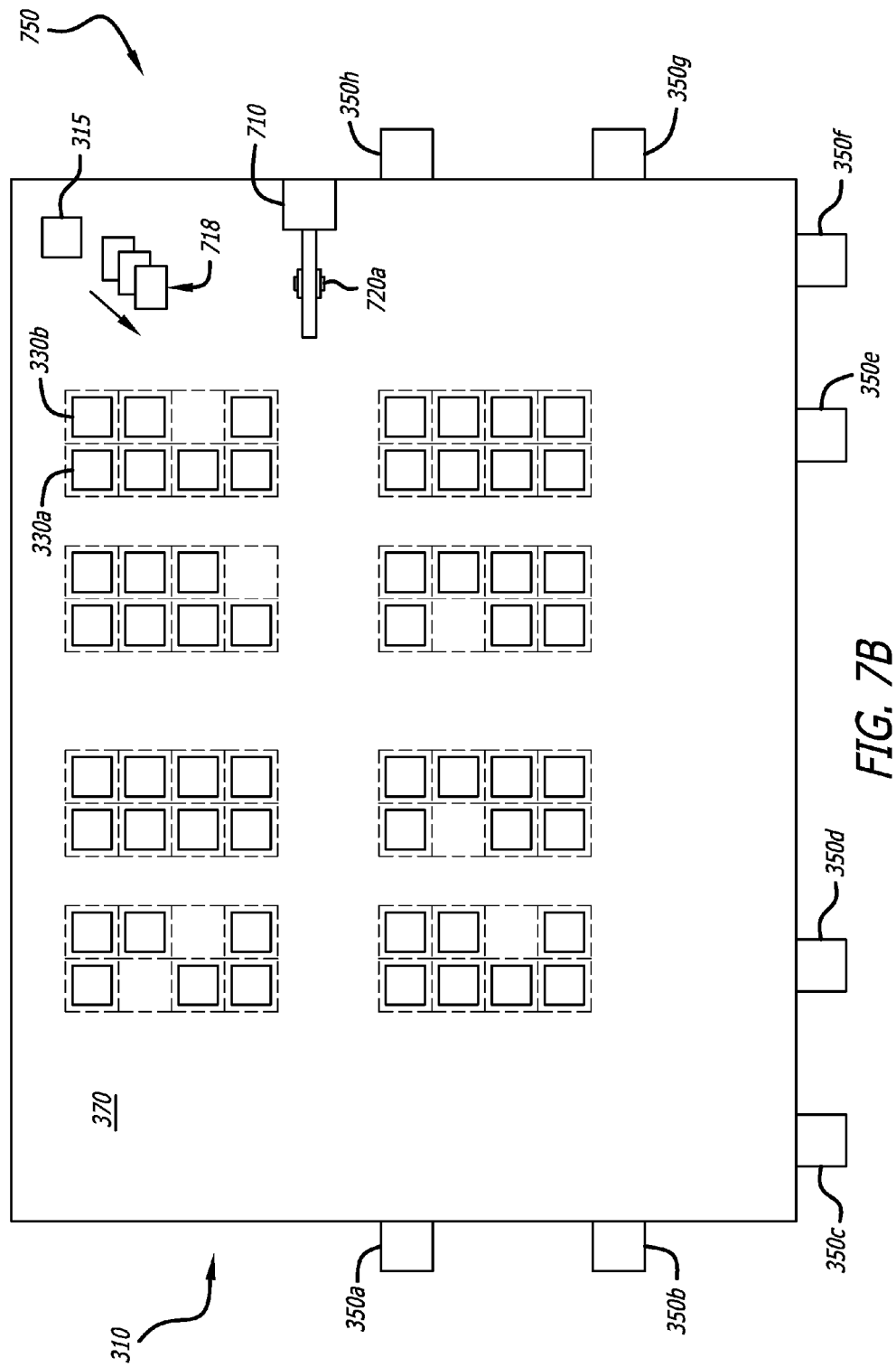

FIGS. 7A and 7B illustrate examples 700 and 750 of the inventory system 310 in accordance with some embodiments. The inventory system 310 illustrated in FIGS. 7A and 7B is the same as the inventory system 310 described in FIG. 3. The examples 700 and 750 show a mobile robotic device that may move in the workspace 370 to a storage unit 710 that stores conveyor(s) that may be docked to the mobile robotic device. In some embodiments, mobile robotic devices that do not have conveyors docked to themselves are included in the inventory system 310. To facilitate the ability of mobile robotic devices to use a conveyor in accordance with the embodiments described herein, the inventory system 310 may provide one or more storage units or spaces ("conveyor holders") 710 that store one or more conveyors of different types. In an embodiment, such a storage unit may be automated to supply a conveyor to a respective mobile robotic device. For example, the automated storage unit may be able to receive instructions from the management module 315 (or a mobile robotic device) where the instructions specify the type of conveyor that is needed (e.g., length, dimensions, speed, weight capacity, any other suitable specification, etc.), and then provide, in an automated manner, the type of conveyor to the mobile robotic device after arriving at the automated storage unit. In an embodiment, the automated storage unit may comprise a type of automated storage and retrieval system which may include a computer-controlled system for automatically placing and retrieving conveyors from defined storage locations within the automated storage unit. In this example, the automated storage unit may be a smaller structure within the workspace 370 that is capable of holding a sufficient amount of conveyors at discrete locations within that smaller structure.

As illustrated in FIG. 7A, the management module 315 may transmit task assignments 718 to a mobile robotic device 720a. The task assignments 718 in this embodiment may include tasks that instruct the mobile robotic device 720a to move to a position adjacent to a conveyor holder 710 in the workspace 370. The task assignments 718, in particular, instruct the mobile robotic device 720a to move along a segment 712 within the workspace 370. Once at the new position at the end of the segment 712, the task assignments 618 may instruct the mobile robotic device 720a to dock with a conveyor received from the conveyor holder 710. In FIG. 7B, the mobile robotic device 720a has docked with a conveyor received from the conveyor holder 710. The management module 315 may then transmit further task assignments after receiving confirmation from the mobile robotic device 720a that the conveyor was successfully received from the conveyor holder 710. In an embodiment, the management module 315 may send a new task assignment instructing the mobile robotic device 720a to move to a new position in the workspace 370 for moving inventory items using the docked conveyor.

Figure 8:
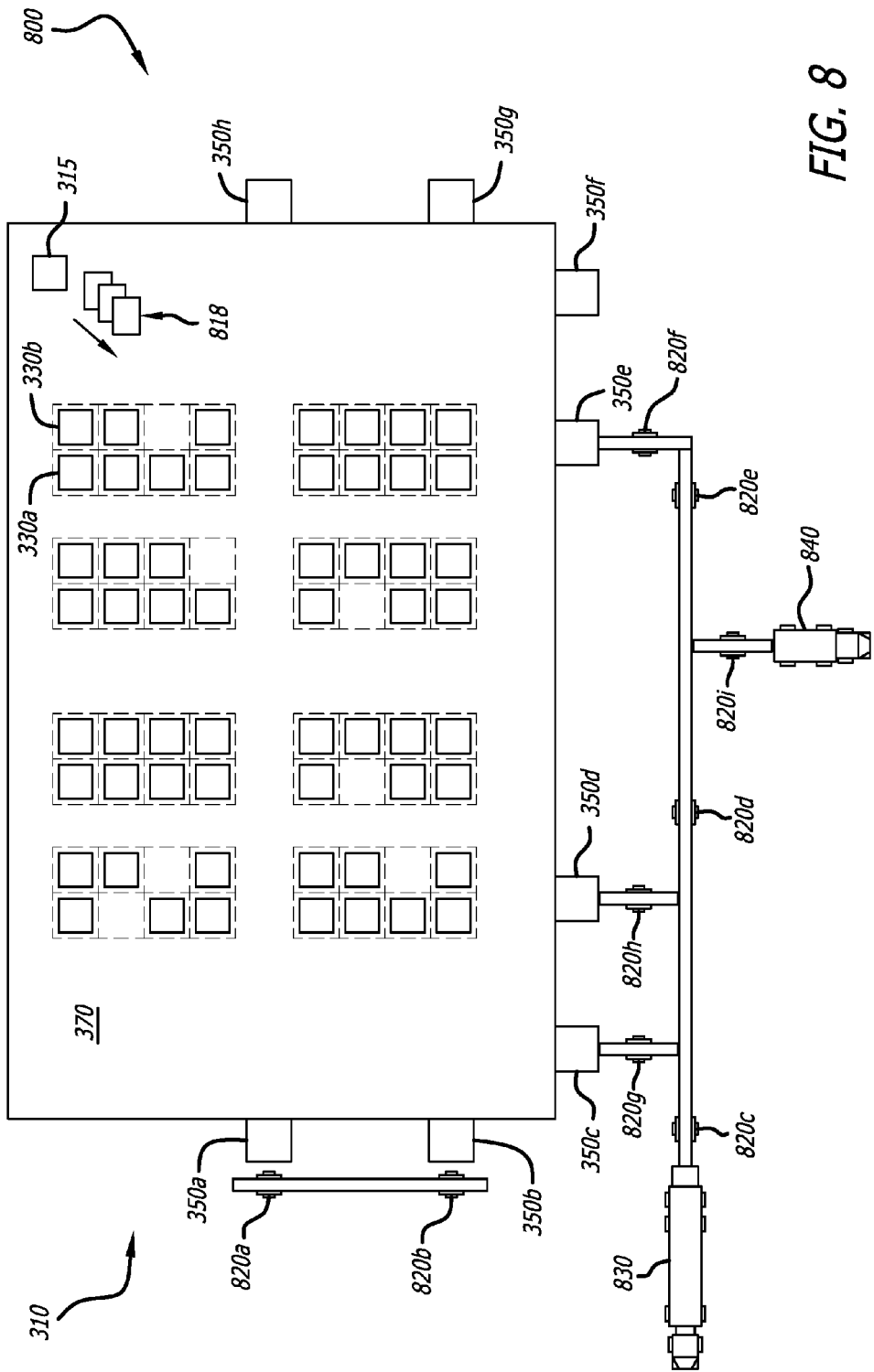
FIG. 8 illustrates an example of the inventory system in accordance with some embodiments.

FIG. 8 illustrates an example 800 of the inventory system 310 in accordance with some embodiments. The inventory system 310 illustrated in FIG. 8 is the same as the inventory system 310 described in FIG. 3. The example 800 shows mobile robotic devices that are performing tasks outside of the workspace 370. As discussed before, the workspace 370 may represent an interior of a structure such as a warehouse or building and, in at least one embodiment, the management module 315 is configured to instruct mobile robotic devices with conveyor attachments to perform tasks outside of the workspace 370.

The management module 315 may transmit at least one task assignment from task assignments 818 to mobile robotic devices 820a and 820b. The task assignments 818 in this embodiment may include tasks that instruct the mobile robotic devices 820a and 820b to dock with a respective conveyor 175 at different ends of the conveyor 175. In this example, the conveyor 175 may be of a particular length such that the mobile robotic devices 820a and 820b are docked at respective ends of the conveyor 175 in order to transport the conveyor to a desired location. Alternatively, the mobile robotic devices 820a and 820b may have an integrated conveyor 175.

The task assignments 818 in this embodiment may also include tasks that instruct the mobile robotic device 820a to move to a position adjacent to an inventory station 350a outside of the workspace 370 and instruct the mobile robotic device 820b to move to a position adjacent to an inventory station 350b outside of the workspace 370. Inventory items, in this example, are to be moved from the inventory station 350a to the inventory station 350b or vice versa. This configuration may enable a human operator to place inventory items that come from the inventory station 350a and then place such items onto the long conveyor docked at one end to the mobile robotic device 820a. The inventory items may then travel along the long conveyor to its other end docked to the mobile robotic device 820b. It is appreciated that this example also contemplates moving inventory items that come from inventory station 350b along the long conveyor to the other end docked to the mobile robotic device 820a.

The management module 315 may transmit other task assignments from task assignments 818 to mobile robotic devices 820c, 820d, and 820e. The task assignments 818 in this embodiment may include tasks that instruct the mobile robotic devices 820c, 820d, and 820e to dock with a respective conveyor 175 at different parts of the conveyor 175 (e.g., at a first end, in the middle, and at a second end). Alternatively, the mobile robotic devices 820c, 820d, and 820e may have an integrated conveyor 175. The task assignments 818 in this embodiment may also include tasks that instruct the mobile robotic device 820c to move to a position adjacent to a vehicle 830 (e.g., a truck), and include tasks to instruct the mobile robotic devices 820d and 820e to follow the movement of the mobile robotic device 820c to position the long conveyer as shown in FIG. 8 outside of the workspace 370. This configuration may enable a human operator to place inventory items that come from the vehicle 830 onto the long conveyor docked at one end to the mobile robotic device 820c. The inventory items may then travel along the long conveyor in a direction to the other end docked to the mobile robotic device 820e.

To facilitate sortation of the inventory items that travel along the length of the long conveyor, the management module 315 may transmit other task assignments from task assignments 818 to mobile robotic devices 820g, 820h, 820i and 820f. The task assignments in this example may instruct the mobile robotic device 820g to dock with a respective conveyor 175 and then move to a position adjacent to the inventory station 350c and adjacent to a portion of the long conveyor near the mobile robotic device 820c. The task assignments in this example may instruct the mobile robotic device 820h to dock with a respective conveyor 175 and then move to a position adjacent to the inventory station 350d and adjacent to a portion of the long conveyor near the mobile robotic device 820d. The task assignments in this example may instruct the mobile robotic device 820i to dock with a respective conveyor 175 and then move to a position adjacent to a vehicle 840 (e.g., another truck) and adjacent to a portion of the long conveyor between the mobile robotic devices 820d and 820e. Further, the task assignments in this example may instruct the mobile robotic device 820f to dock with a respective conveyor 175 and then move to a position adjacent to the inventory station 350e and adjacent to a portion of the long conveyor near the mobile robotic device 820e. This configuration may enable one or more human operators to place inventory items from the vehicle 840 onto the conveyor docked to the mobile robotic device 820i. Alternatively, the conveyors may be connected, via connectors described herein, such that inventory items may be moved between the conveyors docked to mobile robotic devices 820g, 820h, 820i and/or 820f and the long conveyor docked to mobile robotic devices 820c, 820d and 820e without human intervention. In an embodiment, the mobile robotic devices 820g, 820h, 820i and/or 820f may further rotate in order to divert inventory items to other destinations or within the reach of other human operators.

In this example, the configuration shown in FIG. 8 enables inventory items from the vehicle 830 to be placed onto the long conveyor docked at one end to the mobile robotic device 820c and then travel along the long conveyor in a direction to the other end docked to the mobile robotic device 820e. A human operator may sort inventory items that travel along the long conveyor and place such items onto the conveyor docked to the mobile robotic device 820g for arriving at the inventory station 350c. Similarly, a human operator may sort other inventory items that travel along the long conveyor and place such items onto the conveyor docked to the mobile robotic device 820h for arriving at the inventory station 350d. In a similar fashion, another human operator may sort other inventory items that travel along the long conveyor and place such items onto the conveyor docked to the mobile robotic device 820f for arriving at the inventory station 350e. Further, inventory items from the vehicle 840 that are placed onto the conveyor docked to the mobile robotic device 820i may travel to a portion of the long conveyor between the mobile robotic devices 820d and 820e for sortation by a human operator. After being placed onto the long conveyor, the inventory items originally from the vehicle 840 may travel in a direction toward the end of the long conveyor docked to the mobile robotic device 820e and ultimately arriving to the inventory station 350e, or alternatively, travel in a direction toward the portion of the long conveyor docked to the mobile robotic device 820d and ultimately arriving at either the inventory station 350d or 350c depending on whether further sortation is performed. It is appreciated that this example also contemplates moving inventory items that come from inventory stations 350c, 350d, 350e along the conveyor segments to either or both vehicles 830, 840, or moving inventory items between any combination of the stations 350c, 350d, 350e and/or vehicles 830, 840.

Figure 9:
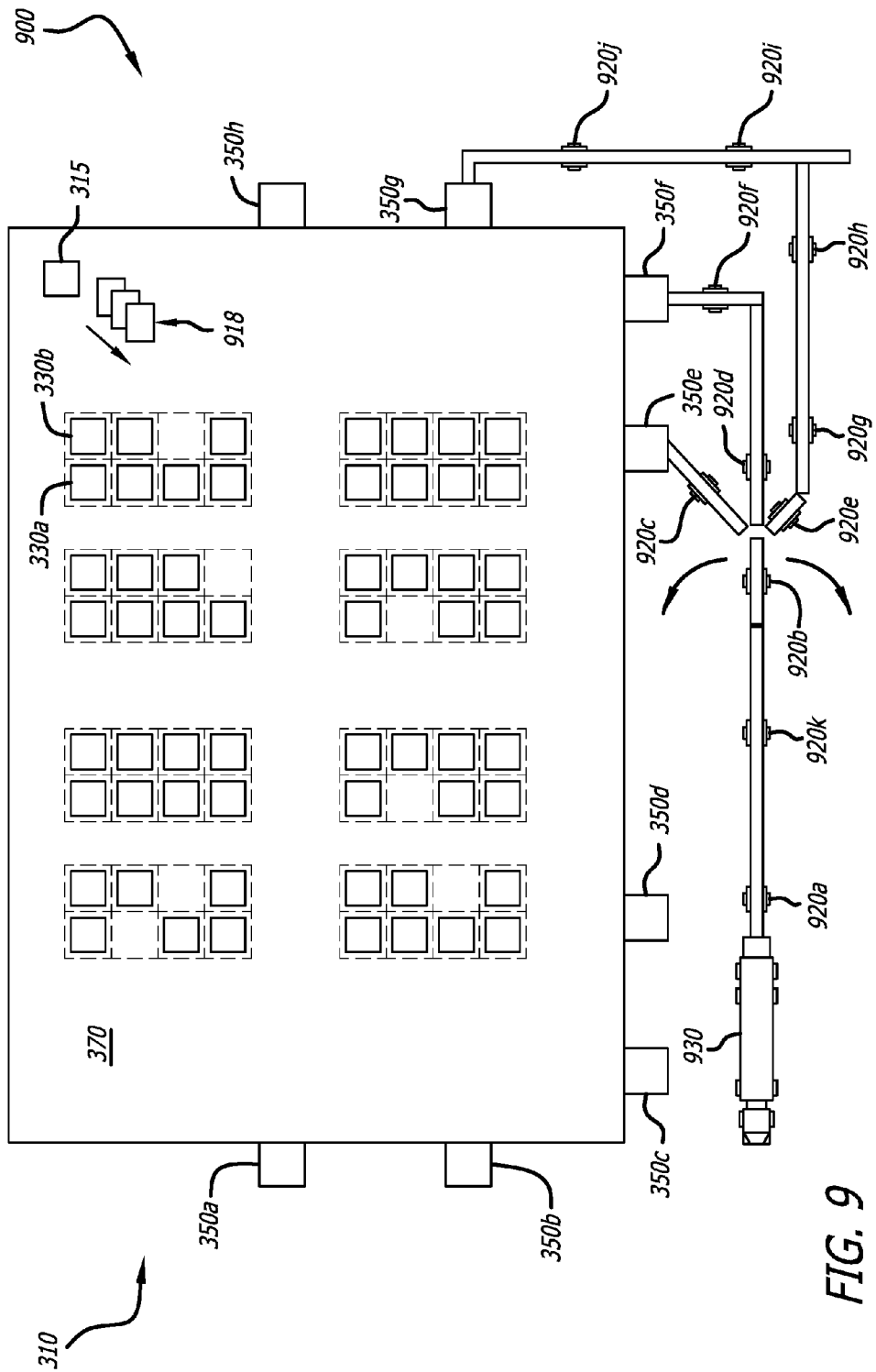
FIG. 9 illustrates an example of the inventory system in accordance with some embodiments.

FIG. 9 illustrates an example 900 of the inventory system 310 in accordance with some embodiments. The inventory system 310 illustrated in FIG. 9 is the same as the inventory system 310 described in FIG. 3. The example 900 shows mobile robotic devices that are performing tasks outside of the workspace 370. As discussed before, the workspace 370 may represent an interior of a structure such as a warehouse or building and, in at least one embodiment, the management module 315 is configured to instruct mobile robotic devices with conveyor attachments to perform tasks outside of the workspace 370.

The management module 315 may transmit at least one task assignment from task assignments 918 to mobile robotic devices 920a and 920k. The task assignments 918 in this embodiment may include tasks that instruct the mobile robotic devices 920a and 920k to dock with a respective conveyor 175 at different ends of the conveyor 175 and move to a position adjacent to a vehicle 930 (e.g., a truck) outside of the workspace 370. The task assignments 918 in this embodiment may include tasks that instruct mobile robotic device 920b to dock with a respective conveyor 175 and then connect with the end of the conveyor docked to the mobile robotic device 920k. This configuration may enable a human operator to place inventory items that come from the vehicle 930 onto the long conveyor docked at one end to the mobile robotic device 920a. The inventory items may then travel along the long conveyor in a direction to the other end docked to the mobile robotic device 920k.

To facilitate sortation of the inventory items coming from the end of the long conveyor docked to the mobile robotic device 920k, the mobile robotic device 920b may rotate (e.g., as indicated by the curved arrows) to sort such items to one or more different destinations. As shown, the mobile robotic device 920b may rotate to enable inventory items to be placed onto a conveyor docked a mobile robotic device 920c for arriving at the inventory station 350e. The mobile robotic device 920b may also rotate to enable inventory items to be placed onto a conveyor docked a mobile robotic device 920d. The inventory items would then travel to another conveyor docked to a mobile robotic device 920f for arriving at the inventory station 350f. Similarly, the mobile robotic device 920b may rotate to enable inventory items to be placed onto a conveyor docked a mobile robotic device 920e. The mobile robotic device 920e could also then rotate to enable the inventory items to be placed onto one end of a long conveyor docked to a mobile robotic device 920g and travel along its length to another end of the long conveyor that is docked to a mobile robotic device 920h. In this example configuration, the inventory items may be further placed onto a portion of another long conveyor that is docked to a mobile robotic device 920i and travel to the other end of the long conveyor docked to a mobile robotic device 920j for arriving at the inventory station 350g. It is appreciated that this example also contemplates moving inventory items that come from inventory stations 350e, 350f, 350g along the conveyor segments to the vehicle 930, or moving inventory items between any combination of the stations 350e, 350f, 350g and/or vehicles 930.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. An inventory management system comprising:
a first robotic device, the first robotic device comprising:

a first head, the first head adjustable to facilitate docking of a plurality of conveyors, wherein the plurality of conveyors are configured to be removably docked with the first head;
a first conveyor of the plurality of conveyors, the first conveyor comprising:
a first connector,
a first motor, and
a first conveyor controller; and
a second robotic device, the second robotic device comprising:
a second head, the second head adjustable to facilitate docking of the plurality of conveyors, wherein the plurality of conveyors are further configured to be removably docked with the second head;
a second conveyor of the plurality of conveyors, the second conveyor comprising:
a second connector adapted to connect with the first connector,
a second motor, and
a second conveyor controller adapted to receive conveyor control signals from the first conveyor controller, the conveyor control signals specifying operations to activate the second motor.

2. The inventory management system of claim 1, wherein:
the first connector comprises a protruding portion;
the second connector comprises a receptacle; and
the protruding portion is configured to engage with the receptacle when the first connector and the second connector connect.

3. The inventory management system of claim 1, wherein the first connector is configured to transfer power from the first robotic device to the second robotic device when the first connector and the second connector connect.

4. The inventory management system of claim 1, wherein the first head is configured to rotate the first conveyor along a vertical axis through a center of the first head.

5. The inventory management system of claim 1, wherein the first head is configured to lift the first conveyor.

6. The inventory management system of claim 1, further comprising a computer system comprising:
a processor; and
a memory storing instructions that when executed by the processor, cause the processor to perform operations comprising:
communicating remote control signals to at least one of the first robotic device or the second robotic device.

7. The inventory management system of claim 6, wherein the remote control signals include routing instructions directing the first robotic device to move along a path from a first location to a second location.

8. The inventory management system of claim 6, wherein the remote control signals include routing instructions directing the second robotic device to move along a path from a first location to a second location.

9. The inventory management system of claim 6, wherein the remote control signals include remote conveyor control signals to the first robotic device to operate the first motor.

10. The inventory management system of claim 1 further comprising a conveyor holder storing a third conveyor adapted to detachably connect to at least one of the first head or the second head.

11. A robotic device comprising:
a rotatable head;
a first conveyor configured to be removably docked with the rotatable head, the first conveyor comprising:
a first connector,
a motor, and
a first conveyor controller comprising a microprocessor for performing operations comprising:
receiving conveyor control signals from a remote management system,
operating the motor of the first conveyor according to the received conveyor control signals, and
communicating the conveyor control signals to a second conveyor using the first connector when a second connector of the second conveyor is attached to the first connector.

12. The robotic device claim 11, wherein:
the first connector comprises a protruding portion, and
the protruding portion is configured to engage with an opening of a receptacle of the second connector.

13. The robotic device of claim 11, wherein the first connector is configured to transfer power to the second conveyor through the second connector when the second conveyor is attached to the first connector.

14. The robotic device of claim 11, wherein the rotatable head is configured to rotate the first conveyor along a vertical axis through a center of the rotatable head based at least in part on the received conveyor control signals.

15. The robotic device of claim 11, wherein the rotatable head is configured to lift the first conveyor based at least in part on the received conveyor control signals.

16. The robotic device of claim 11, further comprising a third conveyor adapted to dock with the rotatable head, wherein the first conveyor and the third conveyor differ in length.

17. A method for inventory management comprising:
controlling a first robotic device, the first robotic device comprising:
a first head, the first head adjustable to facilitate docking of a plurality of conveyors, wherein the plurality of conveyors are configured to be removably docked with the first head;
a first conveyor of the plurality of conveyors, the first conveyor comprising:
a first connector, and
a first conveyor controller; and
controlling a second robotic device, the second robotic device comprising:
a second head, the second head adjustable to facilitate docking of the plurality of conveyors, wherein the plurality of conveyors are further configured to be removably docked with the second head;
a second conveyor of the plurality of conveyors, the second conveyor comprising:
a second connector adapted to connect with the first connector,
a motor, and
a second conveyor controller adapted to receive conveyor control signals from the first conveyor controller, the conveyor control signals specifying operations to activate the motor.

18. The method of claim 17, further comprising communicating routing instructions directing the first robotic device to move along a path from a first location to a second location.

19. The method of claim 18, wherein the second location corresponds with a conveyor holder storing a third conveyor adapted to detachably connect to the first head.

20. The method of claim 19, further comprising controlling the first robotic device to dock the third conveyor with the first head.

* * * * *